US008727694B2

(12) United States Patent
Hiyama et al.

(10) Patent No.: US 8,727,694 B2
(45) Date of Patent: May 20, 2014

(54) CARD ELEVATING/LOWERING DEVICE, CARD CARRYING-OUT/CARRYING-IN DEVICE AND CARD ISSUING/COLLECTING APPARATUS

(75) Inventors: Chisato Hiyama, Nagano (JP); Keiji Ohta, Nagano (JP); Takeki Watanabe, Nagano (JP)

(73) Assignee: Nidec Sankyo Corporation (JP)

( * ) Notice: Subject to any disclaimer, the term of this patent is extended or adjusted under 35 U.S.C. 154(b) by 445 days.

(21) Appl. No.: 13/121,894

(22) PCT Filed: Sep. 26, 2009

(86) PCT No.: PCT/JP2009/004899

§ 371 (c)(1),
(2), (4) Date: Jun. 7, 2011

(87) PCT Pub. No.: WO2010/038402

PCT Pub. Date: Apr. 8, 2010

(65) Prior Publication Data

US 2011/0236172 A1 Sep. 29, 2011

(30) Foreign Application Priority Data

Sep. 30, 2008 (JP) ................................ 2008-252939
Sep. 30, 2008 (JP) ................................ 2008-254271

(51) Int. Cl.

| | |
|---|---|
| ***B23Q 7/10*** | (2006.01) |
| ***B24B 49/00*** | (2012.01) |
| ***G02C 13/00*** | (2006.01) |
| ***B65H 31/30*** | (2006.01) |
| ***B65H 9/10*** | (2006.01) |
| ***B65H 31/34*** | (2006.01) |

(52) U.S. Cl.
USPC ......... 414/793.8; 414/925; 187/363; 187/367

(58) Field of Classification Search
USPC .......... 108/136; 187/208, 265, 363, 365, 367, 187/373; 211/59.3; 254/385; 271/152, 156, 271/223, 224; 414/592, 785, 788.9, 793.8, 414/794.8, 796.7, 924, 925; 901/48
See application file for complete search history.

(56) References Cited

U.S. PATENT DOCUMENTS 3,063,578 A * 11/1962 Millar ........................ 414/796.7
3,666,263 A * 5/1972 Gluskin ........................ 271/152

(Continued)

FOREIGN PATENT DOCUMENTS

JP 2-144329 A 6/1990
JP 4-358632 A 12/1992

(Continued)

OTHER PUBLICATIONS

International Search Report for International Application No. PCT/JP2009/004899 mailed Dec. 15, 2009 with English translation.

*Primary Examiner* — Gregory Adams
(74) *Attorney, Agent, or Firm* — Cantor Colburn LLP

(57) ABSTRACT

A card elevating/lowering device for use with cards may include a card storage part in which the cards are stacked and accommodated, and an elevating/lowering mechanism by which the cards accommodated in the card storage part are elevated and lowered. The elevating/lowering mechanism may be provided with a placing table on which the cards accommodated in the card storage part are placed and an urging member which urges the placing table in an upper direction, and a spring constant of the urging member may be substantially equal to a weight per unit thickness of the card.

8 Claims, 21 Drawing Sheets

(56) References Cited

U.S. PATENT DOCUMENTS

| | | | | |
|---|---|---|---|---|
| 3,796,285 | A * | 3/1974 | Grebenstein | 187/255 |
| 4,356,892 | A * | 11/1982 | Mossey | 187/231 |
| 4,921,388 | A * | 5/1990 | Nelson | 414/412 |
| 4,964,221 | A * | 10/1990 | Breyer et al. | 33/503 |
| 5,221,075 | A * | 6/1993 | Habicht | 254/387 |
| 5,305,996 | A * | 4/1994 | Taniwa et al. | 271/22 |
| 5,411,246 | A * | 5/1995 | Nonomura et al. | 271/117 |
| 6,010,129 | A * | 1/2000 | Mochizuki et al. | 271/299 |
| 6,168,151 | B1 * | 1/2001 | Tsuchida | 271/126 |
| 6,270,072 | B1 * | 8/2001 | Louie | 271/157 |
| 6,981,698 | B2 * | 1/2006 | Yamamiya et al. | 271/10.01 |

FOREIGN PATENT DOCUMENTS

| | | | |
|---|---|---|---|
| JP | 5-155450 | A | 6/1993 |
| JP | 11-116072 | A | 4/1999 |
| JP | 2000-34025 | A | 2/2000 |
| JP | 2001-118137 | A | 4/2001 |
| JP | 2003-246479 | A | 9/2003 |
| JP | 2008-105832 | A | 5/2008 |

* cited by examiner

CARD ELEVATING/LOWERING DEVICE, CARD CARRYING-OUT/CARRYING-IN DEVICE AND CARD ISSUING/COLLECTING APPARATUS

CROSS REFERENCE TO RELATED APPLICATIONS

This is a U.S. national stage of international application No. PCT/JP2009/004899, filed on Sep. 26, 2009. Priority under 35 U.S.C. §119(a) and 35 U.S.C. §365(b) is claimed from Japanese Application Nos. 2008-252939, filed Sep. 30, 2008; and 2008-254271, filed Sep. 30, 2008; the disclosures of each of which are also incorporated herein by reference.

TECHNICAL FIELD

The present invention relates to a card elevating/lowering device in which a card is elevated and lowered in a card storage part where cards are stacked and accommodated, and to a card carrying-out/carrying-in device by which a card is carried out from the card storage part and a card is carried into the card storage part. Further, the present invention relates to a card issuing/collecting device which is provided with the card elevating/lowering device.

BACKGROUND

A card issuing apparatus has been conventionally known by which a card which is stacked and accommodated in a cassette (cartridge) is issued. This type of a card issuing apparatus is provided with a lifting device in which a card stacked in a cassette is lifted (see, for example, Patent Literature 1). The lifting device described in Patent Literature 1 is provided with a lifting frame on which a card is placed, a long and thin rack for lifting and lowering the frame, a pinion which is engaged with the rack, and a motor for rotationally driving the pinion. In the lifting device, one end of the rack is fixed to the lifting frame and, with rotation of the pinion which is disposed on an upper side with respect to the lifting frame, the frame and cards placed on the frame are lifted.

Further, this type of the card issuing apparatus is provided with a paying-out device for sending out cards stacked in the cassette one by one (see, for example, Patent Literature 1). The paying-out device described in Patent Literature 1 is provided with a fan for sucking a card located at the uppermost position (card at the highest) of cards stacked in the cassette, a tire with which an upper face of the card sucked by the fan is abutted, a roller for sending out the card which is abutted with the tire, an auxiliary roller which is oppositely disposed to the roller, and a reversing roller for preventing two cards from being sent out (double feeding).

[PTL 1] Japanese Patent Laid-Open No. 2001-118137

As described above, in the lifting device described in Patent Literature 1, lifting of a card is performed by a rack and a pinion. Therefore, a drive mechanism such as a motor for rotationally driving the pinion is required and thus a structure of the device is complicated. Further, in the lifting device described in Patent Literature 1, the motor is activated whenever a card is issued and the pinion is rotated to move a card upward. Therefore, control for the lifting device is complicated.

Further, recently, cards having been issued in large quantities from a card issuing apparatus are increasingly being collected and reused. In this case, a card collecting apparatus for collecting a card is installed separately from the card issuing apparatus and cards are collected by the card collecting apparatus. Collected cards are set in the card issuing apparatus to be reused. As described above, in order to reuse a card to be issued, a card issuing apparatus and a card collecting apparatus are required to be separately installed, which is inconvenient. Therefore, in the market, a card issuing/collecting apparatus is required which is capable of issuing a card from a cassette and collecting a card into the cassette.

However, in Patent Literature 1, a structure for carrying out a card stacked in a cassette is disclosed but a structure for carrying a card into the cassette is not disclosed. Therefore, it is difficult to realize a card issuing/collecting apparatus which is provided with a card issuing function from a cassette and a card collecting function into the cassette by using the paying-out device described in Patent Literature 1.

In view of the problem described above, at least an embodiment of the present invention provides a card elevating/lowering device which is capable of appropriately elevating and lowering cards with a simple structure and a card issuing/collecting apparatus which is provided with the card elevating/lowering device.

Further, at least an embodiment of the present invention provides a card carrying-out/carrying-in device which is capable of appropriately performing carrying-out of a card from a card storage part in which cards are stacked and accommodated and performing carrying-in of a card to the card storage part. Further, at least an embodiment of the present invention is to provide a card issuing/collecting apparatus which is provided with the card carrying-out/carrying-in device.

SUMMARY

In order to attain the above, at least an embodiment the present invention provides a card elevating/lowering device including a card storage part in which cards are stacked and accommodated, and an elevating/lowering mechanism by which the cards accommodated in the card storage part are elevated and lowered. The elevating/lowering mechanism is provided with a placing table on which the cards accommodated in the card storage part are placed and an urging member which urges the placing table in an upper direction, and a spring constant of the urging member is substantially equal to a weight per unit thickness of the card.

In the card elevating/lowering device of at least an embodiment of the present invention, the elevating/lowering mechanism is provided with an urging member for urging the placing table in the upper direction on which cards accommodated in the card storage part are placed, and a spring constant of the urging member is substantially equal to a weight per unit thickness of the card. Therefore, when a card is carried out from an upper end side of the card storage part, the urging member is contracted or extended by the number of sheets of the card carried out from the card storage part and the cards placed on the placing table are moved upward. Further, when a card is carried into the card storage part, the urging member is extended or contracted by the number of sheets of the card accommodated in the card storage part and the cards placed on the placing table are moved down. Therefore, the position of the highest (uppermost) card of the cards accommodated in the card storage part can be maintained at the same position. Alternatively, the uppermost card can be abutted with a roller or the like for taking out a card with a constant pressure. As a result, in at least an embodiment of the present invention, cards can be appropriately elevated and lowered with a simple structure in which an urging member is used.

In at least an embodiment of the present invention, it is preferable that the urging member is a tension coil spring. According to this structure, setting of the spring constant is relatively easy. Further, a stroke of the urging member can be relatively longer and thus the number of sheets of cards which are accommodated in the card storage part can be increased.

In at least an embodiment of the present invention, it is preferable that the elevating/lowering mechanism is provided with a pulley for spring over which the tension coil spring is hanged. According to this structure, the tension coil spring can be turned around in the up-and-down direction and thus the size of the card elevating/lowering device is reduced in the up-and-down direction.

In at least an embodiment of the present invention, it is preferable that one end of the tension coil spring is attached to the placing table and the other end of the tension coil spring is attached to a spring end fixing member which is movable in an up-and-down direction. According to this structure, the position of the other end of the tension coil spring can be arbitrarily changed, the position of the placing table to which one end of the tension coil spring is attached can be changed arbitrarily. Therefore, the position of the uppermost card which is placed on the placing table can be set arbitrarily. As a result, an accommodating space for a card is capable of forming on an upper end side of the card storage part and thus a card can be accommodated in the card storage part.

In at least an embodiment of the present invention, the spring end fixing member is, for example, attached to a belt which is stretched over at least two pulleys for belt that are disposed in a separated state in the up-and-down direction. Further, in this case, it is preferable that the pulley for belt is a toothed pulley and the belt is a toothed belt. According to this structure, slip between the pulley and the belt is prevented and thus the spring end fixing member can be elevated and lowered with a high degree of accuracy.

In at least an embodiment of the present invention, it is preferable that the elevating/lowering mechanism is provided with a holding mechanism for holding a position of the spring end fixing member in the up-and-down direction and a releasing mechanism for releasing a holding state of the spring end fixing member by the holding mechanism. According to this structure, the position of the spring end fixing member to which the other end of the tension coil spring is attached is held by the holding mechanism and thus positional displacement of the uppermost card that is placed on the placing table to which one end of the tension coil spring is attached is prevented. Further, when the releasing mechanism is operated, the spring end fixing member can be set in a state to be capable of being elevated and lowered.

In at least an embodiment of the present invention, it is preferable that the holding mechanism is provided with a rack having a plurality of rack teeth and disposed with the up-and-down direction as a longitudinal direction, an engagement pawl which is attached to the spring end fixing member in a relatively movable state and is capable of being engaged with the rack tooth, and an engagement pawl urging member which urges the engagement pawl toward the rack tooth, and the releasing mechanism is provided with a releasing member, which is turned with the up-and-down direction as an axial direction to move the engagement pawl in a direction that engagement of the rack tooth with the engagement pawl is released, and a turning mechanism for turning the releasing member. According to this structure, the spring end fixing member can be held by a plurality of rack teeth over a relatively wide range in the up-and-down direction. Further, the holding position of the spring end fixing member can be set finely by a plurality of the rack teeth. In other words, the position of the uppermost card which is placed on the placing table can be set finely.

In at least an embodiment of the present invention, it is preferable that a detection mechanism is provided for detecting that the uppermost card of the cards which are accommodated in the card storage part is located at a predetermined position, and the detection mechanism is disposed so that a predetermined space is formed between the uppermost card which is detected by the detection mechanism and an upper end of the card storage part. According to this structure, an appropriate accommodating space for a card is formed on the upper end side of the card storage part. Further, an accommodating space for a card can be formed on the upper end side of the card storage part with a high degree of accuracy.

In at least an embodiment of the present invention, it is preferable that a flat spring is disposed on an upper end side of the card storage part for pressing a card toward one side which is dropped from an upper side of the card storage part. According to this structure, frictional resistance between the inner walls of the card storage part and a plurality of accommodated cards can be reduced and thus cards are accommodated in the card storage part appropriately.

In other words, when a card is randomly dropped into the card storage part from the upper side of the card storage part, a card abutting with an inner wall on one side, a card abutting with an inner wall on the other side, and a card abutting with neither of the inner walls are stacked at random. Further, when the stacked number of the cards is increased, frictional resistance between the cards becomes large and each of the cards is hardly displaced to the one side or to the other side. Therefore, the entire of the stacked cards are brought into a state that external forces are applied to the stacked cards from both of the inner walls on the one side and the other side and thus frictional resistance between the card storage part and a plurality of accommodated cards becomes large. On the other hand, in a case that a flat spring is disposed for pressing a dropping card toward one side, the card is hard to be abutted with the inner wall on the other side of the card storage part and thus the entire stacked cards are hard to be a state that external forces are applied from both of the inner walls. Therefore, frictional resistance can be reduced between the inner walls of the card storage part and a plurality of the accommodated cards and the cards can be appropriately accommodated in the card storage part.

The card elevating/lowering device in at least an embodiment of the present invention may be applied to a card issuing/collecting apparatus which is provided with a card carrying-out/carrying-in device in which a card is carried out from the card storage part and a card is carried into the card storage part. In the card issuing/collecting apparatus, cards can be elevated and lowered appropriately with a simple structure in which the urging member is used.

Additionally, at least an embodiment of the present invention provides a card carrying-out/carrying-in device in which a card is carried out from a card storage part in which cards are stacked and accommodated and a card is carried into the card storage part, including a carrying roller which is abutted with the card for carrying the card, a counter roller which is oppositely disposed to the carrying roller and urged toward the carrying roller so as to be abutted with the card carried by the carrying roller, a motor which drives the carrying roller and the counter roller, and a power transmission mechanism which transmits power of the motor to the counter roller. The power transmission mechanism is structured so that the counter roller is capable of rotating in the same direction as a rotating direction of the carrying roller by power of the motor.

Further, the power transmission mechanism is provided with a torque limiter which intermits power transmission from the motor to the counter roller depending on a magnitude of the power transmitted from the motor to the counter roller when the carrying roller is rotated in a direction that the card is carried out, and a one way clutch which disconnects power transmission from the motor to the counter roller when the carrying roller is rotated in a direction that the card is carried into inside.

In at least an embodiment of the present invention, the torque limiter is, for example, structured so that, when one piece of card is sandwiched between the carrying roller and the counter roller, power transmission from the motor to the counter roller is disconnected and, when two pieces of card are sandwiched between the carrying roller and the counter roller, power is transmitted from the motor to the counter roller.

In the card carrying-out/carrying-in device in at least an embodiment of the present invention, the power transmission mechanism is structured so that the counter roller is capable of rotating in the same direction as a rotating direction of the carrying roller by power of the motor. Further, the power transmission mechanism is provided with a torque limiter which intermits power transmission from the motor to the counter roller depending on a magnitude of the power transmitted from the motor to the counter roller when the carrying roller is rotated in a direction that the card is carried out.

Therefore, when one piece of card is sandwiched between the carrying roller and the counter roller and thus frictional resistance between the card which is abutted with the counter roller and the carrying roller becomes large, the torque limiter is operated and the power transmission from the motor to the counter roller is disconnected. In other words, the counter roller is rotated in a direction reverse to the rotating direction of the carrying roller (in other words, the counter roller is rotated following the carrying roller) and thus one piece of a card sandwiched between the carrying roller and the counter roller can be carried out appropriately.

Further, when two pieces of card are sandwiched between the carrying roller and the counter roller and thus frictional resistance between the card which is abutted with the counter roller and the other card becomes small, the torque limiter is not operated and power is transmitted from the motor to the counter roller. In other words, the counter roller is rotated in the same direction as the rotating direction of the carrying roller (in other words, the counter roller is rotated in a direction that a card is carried into the inside) and thus a card abutted with the counter roller is capable of being returned. Further, a card abutting with the carrying roller can be carried out as it is. Therefore, double feeding of cards in which two pieces of card are simultaneously carried out is prevented.

Further, in the card carrying-out/carrying-in device in at least an embodiment of the present invention, the power transmission mechanism is provided with a one way clutch which disconnects power transmission from the motor to the counter roller when the carrying roller is rotated in a direction so that the card is carried into inside. Therefore, when a card is to be carried into the inside, the counter roller runs idle following the carrying roller in the carrying-in direction of the card. Therefore, a carrying-in operation of the card is not disturbed by the counter roller.

As described above, in at least an embodiment of the present invention, when a card is to be carried out, double feeding of cards is prevented and a card can be carried out from the card storage part appropriately. Further, when a card is to be carried into the inside, the card can be carried into the card storage part appropriately.

In at least an embodiment of the present invention, it is preferable that the card carrying-out/carrying-in device is provided with a taking-out roller which is abutted with an upper face of the uppermost card of the cards stacked in the card storage part that is disposed on the underside for sending out the uppermost card toward the carrying roller, and a support member which is abutted with the upper face of the uppermost card for supporting the uppermost card. The taking-out roller is provided with a large diameter part which is formed over a predetermined angular range with respect to a rotation center and a small diameter part having a smaller radius than the large diameter part, and a radius of the large diameter part is set to be a size so that the large diameter part is capable of abutting with the upper face of the uppermost card which is supported by the support member, and a radius of the small diameter part is set to be a size so that the small diameter part is unable to be abutted with the upper face of the uppermost card which is supported by the support member.

According to this structure, the uppermost card is sent out to the carrying roller by the large diameter part of the taking-out roller. Further, after the uppermost card has been sent out, the next uppermost card is supported by the support member and the taking-out roller does not send out the next uppermost card. In other words, after the uppermost card has been sent out by the large diameter part, the small diameter part is passed through the upper side of the card abutting with the support member and thus the taking-out roller does not send out the next uppermost card. Therefore, a card can be sent out to the carrying roller one by one with a simple structure in which the taking-out roller and the support member are used.

In at least an embodiment of the present invention, it is preferable that the card carrying-out/carrying-in device is provided with three support members and the uppermost card is supported by three points. According to this structure, the uppermost card is supported in a stable state.

In at least an embodiment of the present invention, it is preferable that the support member is a support roller which is rotatably abutted with the upper face of the uppermost card. According to this structure, even when a card is abutted with the support member, the card is restrained from being damaged.

In at least an embodiment of the present invention, it is preferable that the taking-out roller is turned so that the large diameter part begins to abut with a roughly center position in the carrying-in direction of the card at a timing when the card sandwiched between the carrying roller and the counter roller is separated from between the carrying roller and the counter roller during a carrying-in operation. According to this structure, a roughly center position of the card in the carrying-in direction is tapped by the large diameter part and thus the card is easily dropped into the inside of the card storage part in a horizontal state. Therefore, the card carried into the inside can be appropriately stacked in the card storage part.

The card carrying-out/carrying-in device in at least an embodiment of the present invention may be applied to a card issuing/collecting apparatus which is provided with a card elevating/lowering device having a card storage part that is disposed on an under side of the card carrying-out/carrying-in device and by which the cards in the card storage part are elevated and lowered. In the card issuing/collecting apparatus, a carrying-out operation of a card from the card storage part and a carrying-in operation of a card to the card storage part are performed appropriately. Therefore, the card issuing function and the card collecting function are attained by only one apparatus.

As described above, in the card elevating/lowering device and the card issuing/collecting apparatus in at least an embodiment of the present invention, a card is appropriately elevated and lowered with a simple structure in which the urging member is used.

Further, in the card carrying-out/carrying-in device and the card issuing/collecting apparatus in at least an embodiment of the present invention, a carrying-out operation of a card from the card storage part and a carrying-in operation of a card to the card storage part are performed appropriately.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 1 is a perspective view showing a card issuing/collecting apparatus in accordance with an embodiment of the present invention.

FIG. 2 is a front view showing the card issuing/collecting apparatus in FIG. 1.

FIG. 3 is a rear view showing the card issuing/collecting apparatus in FIG. 1.

FIG. 4 is a perspective view showing a main part of a card elevating/lowering device shown in FIG. 1 which is viewed from an under side on the right front side.

FIG. 5 is a perspective view showing the main part of the card elevating/lowering device shown in FIG. 1 which is viewed from an upper side on the right rear side.

FIG. 6 is a perspective view showing the main part of the card elevating/lowering device shown in FIG. 1 which is viewed from an upper side on the left rear side.

FIG. 7 is a side view showing a part of the card elevating/lowering device shown in FIG. 1 which is viewed from a left side.

FIG. []

Figure 4:
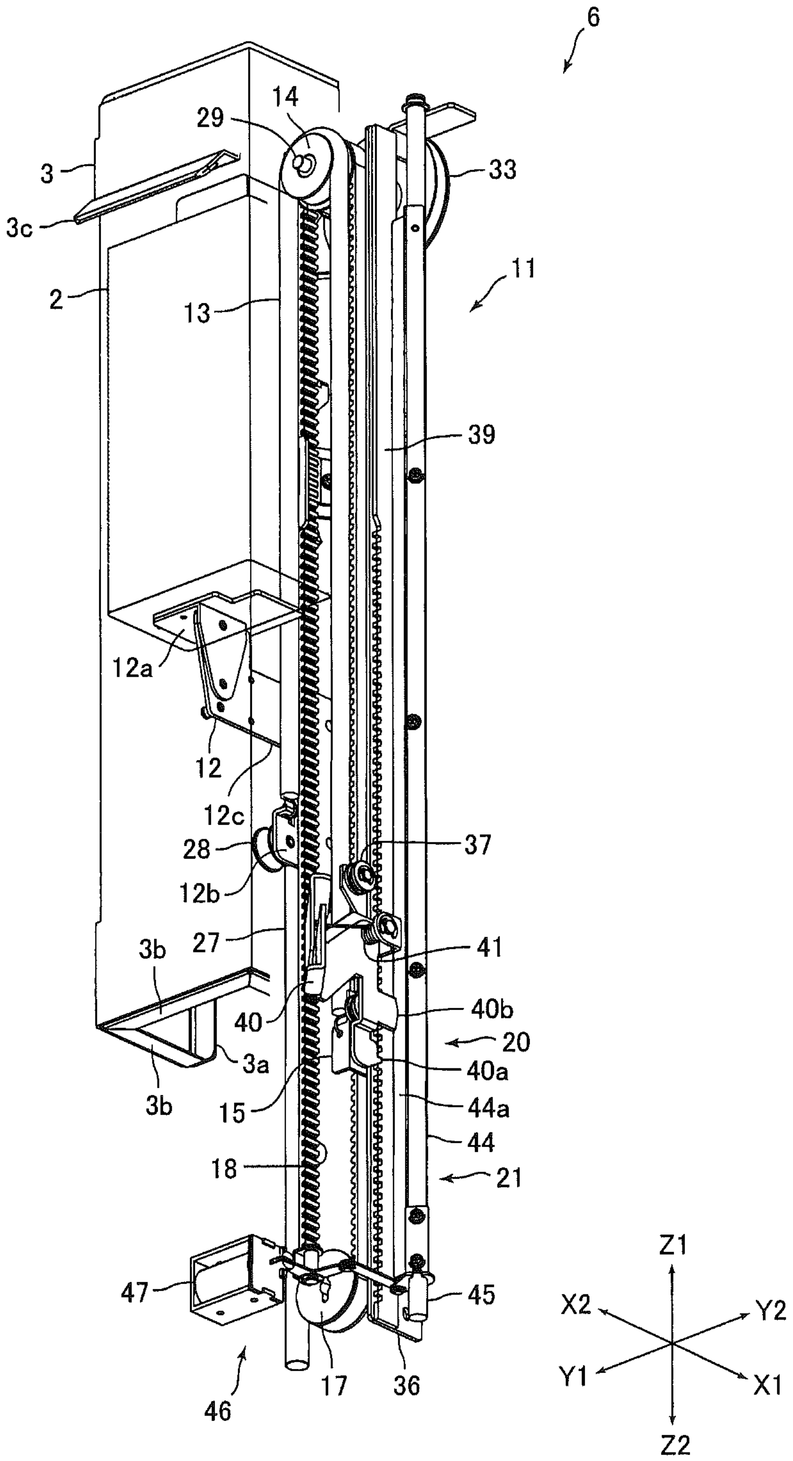
[FIG.4]
Figure 8:
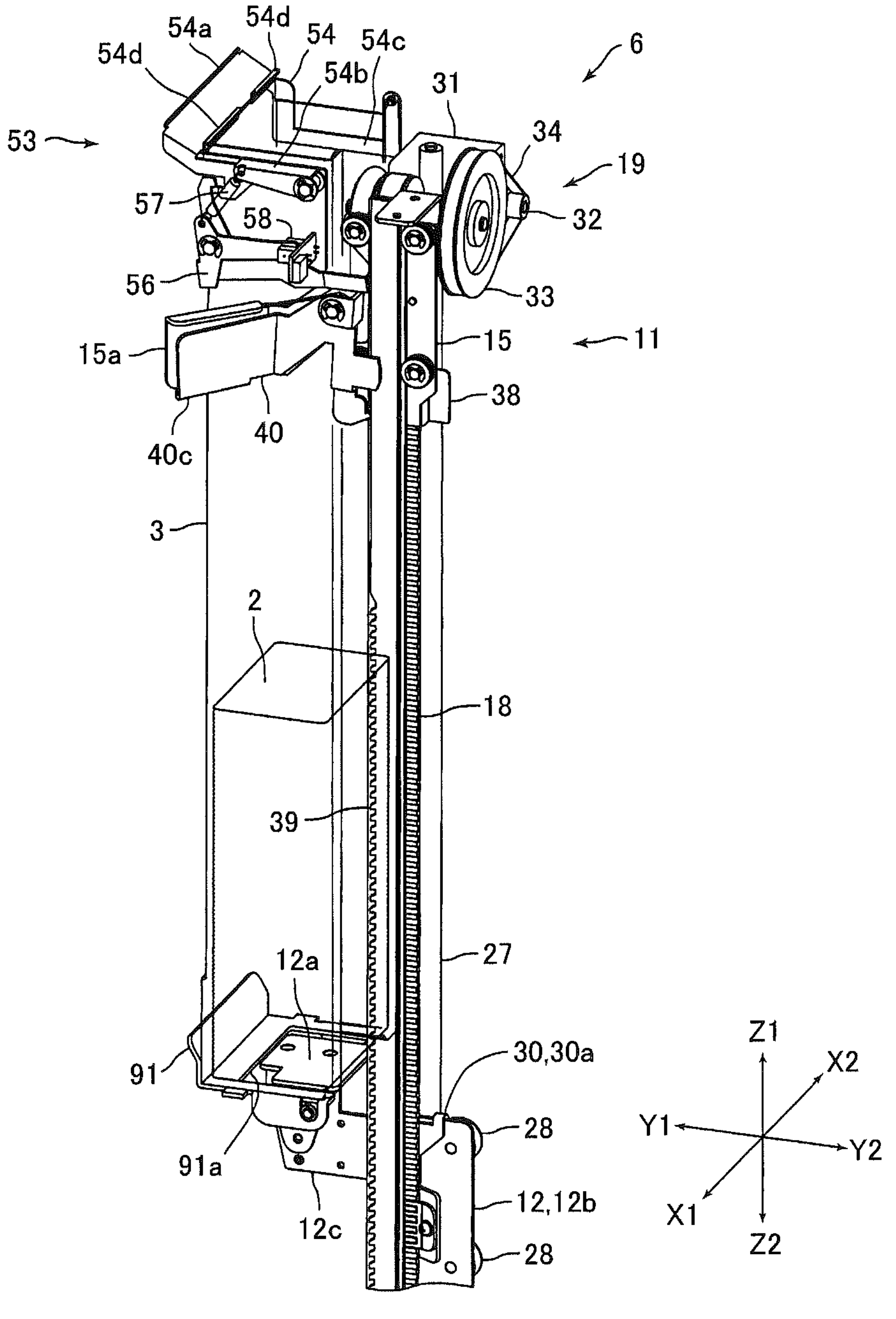

FIG. 8 is a perspective view showing a part of the card elevating/lowering device including a cartridge holding mechanism that holds a cartridge shown in FIG. 4 which is viewed from an upper side on the right rear side.

[FIG. 9]

Figure 9:
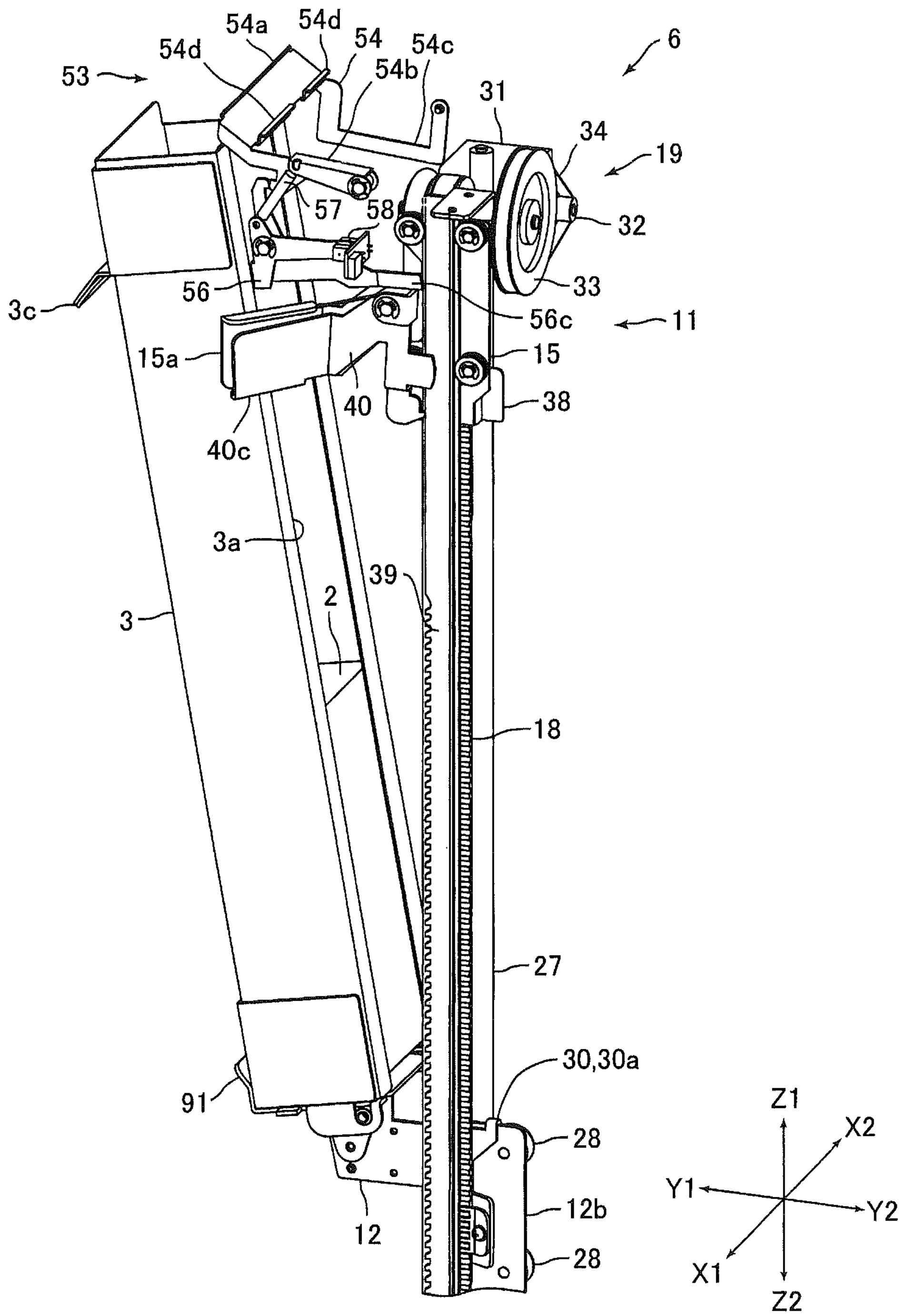

FIG. 9 is a perspective view showing a part of the card elevating/lowering device when the cartridge shown in FIG. 4 is to be detached which is viewed from an upper side on the right rear side.

[FIG. 10]

Figure 10:
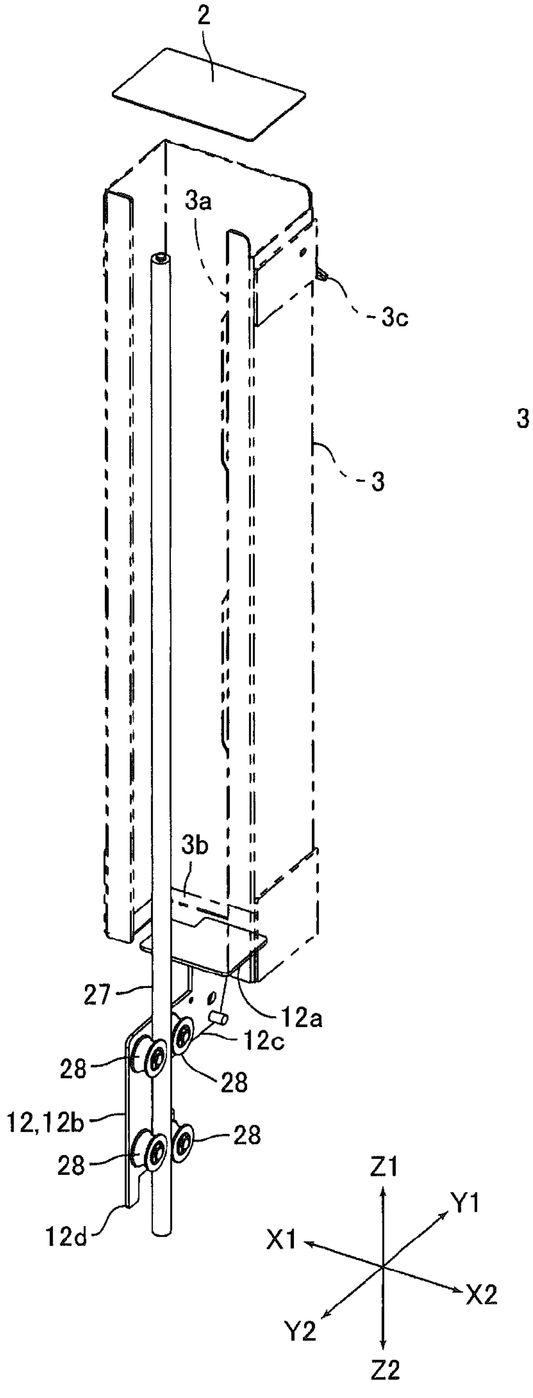
Figure 10:
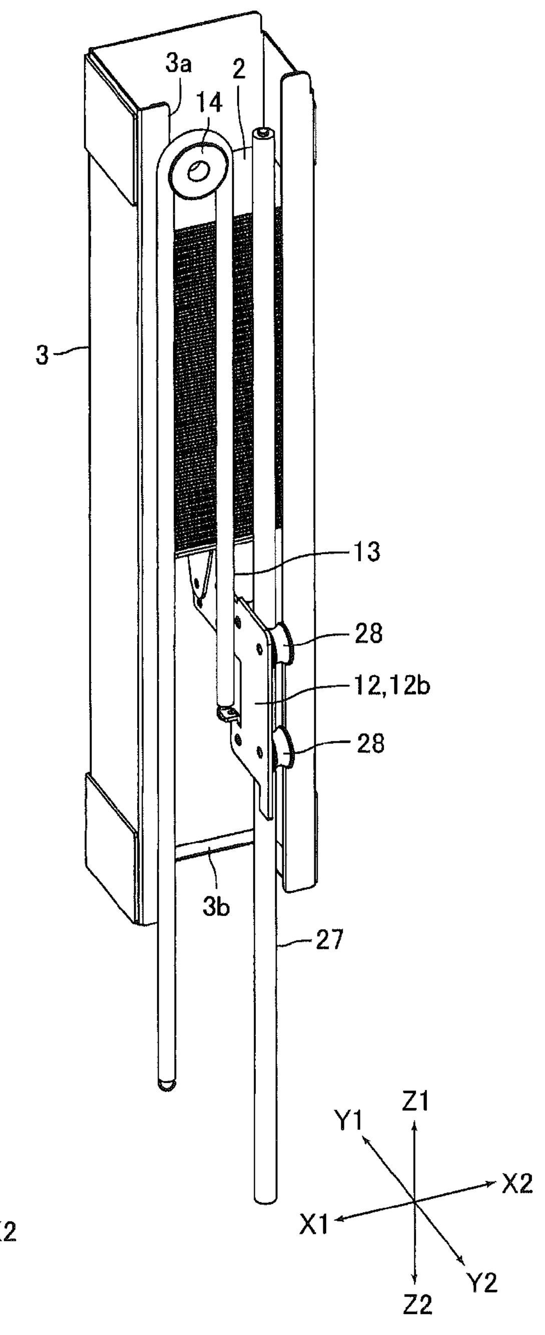

FIGS. 10(A) and 10(B) are perspective views showing a part of the elevating/lowering mechanism shown in FIG. 4.

[FIG. 11]

Figure 5:
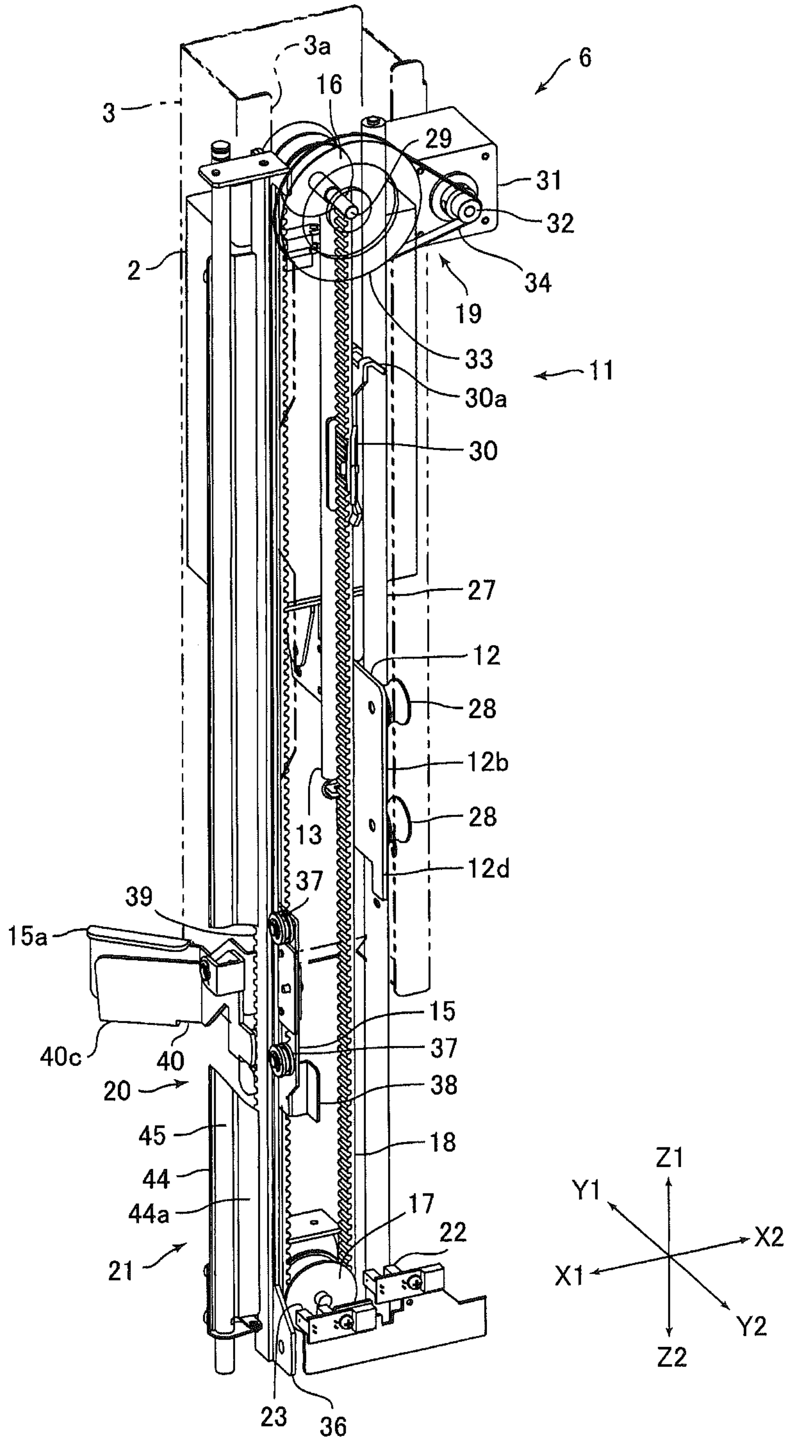
[FIG. 5]
Figure 11:
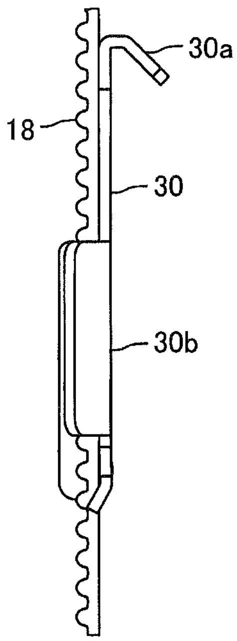
Figure 11:
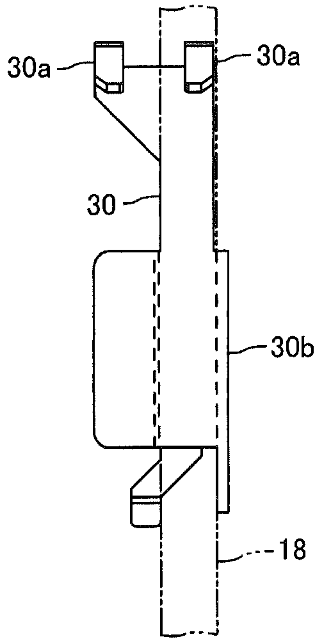

FIG. 11(A) is a view showing a hanging tool shown in FIG. 5 which is viewed from a rear side, and FIG. 11(B) is a view showing the hanging tool shown in FIG. 5 which is viewed from a left side.

[FIG. 12]

Figure 12:
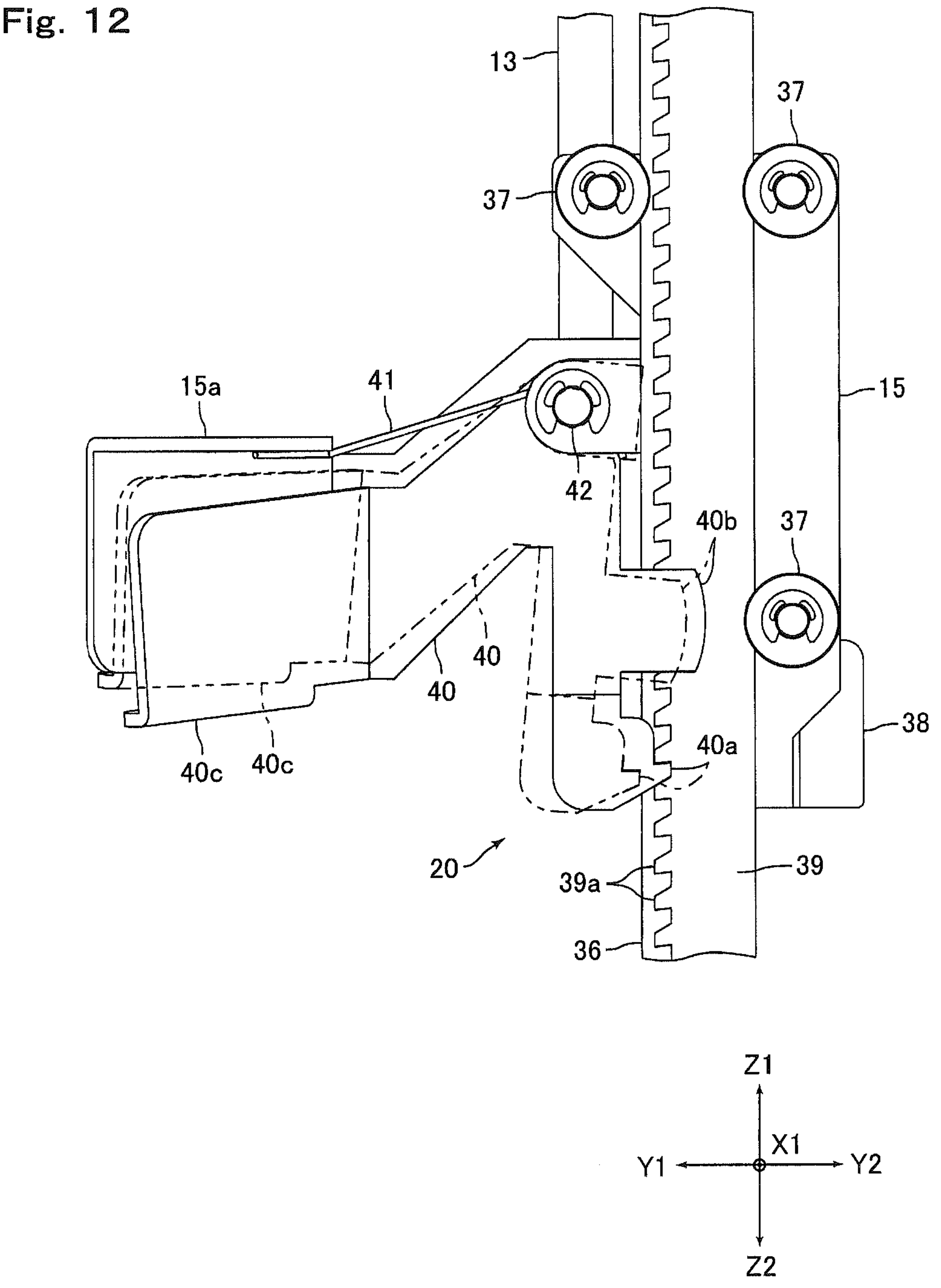

FIG. 12 is an enlarged view showing a main part of a holding mechanism shown in FIG. 4.

[FIG. 13]

Figure 13:
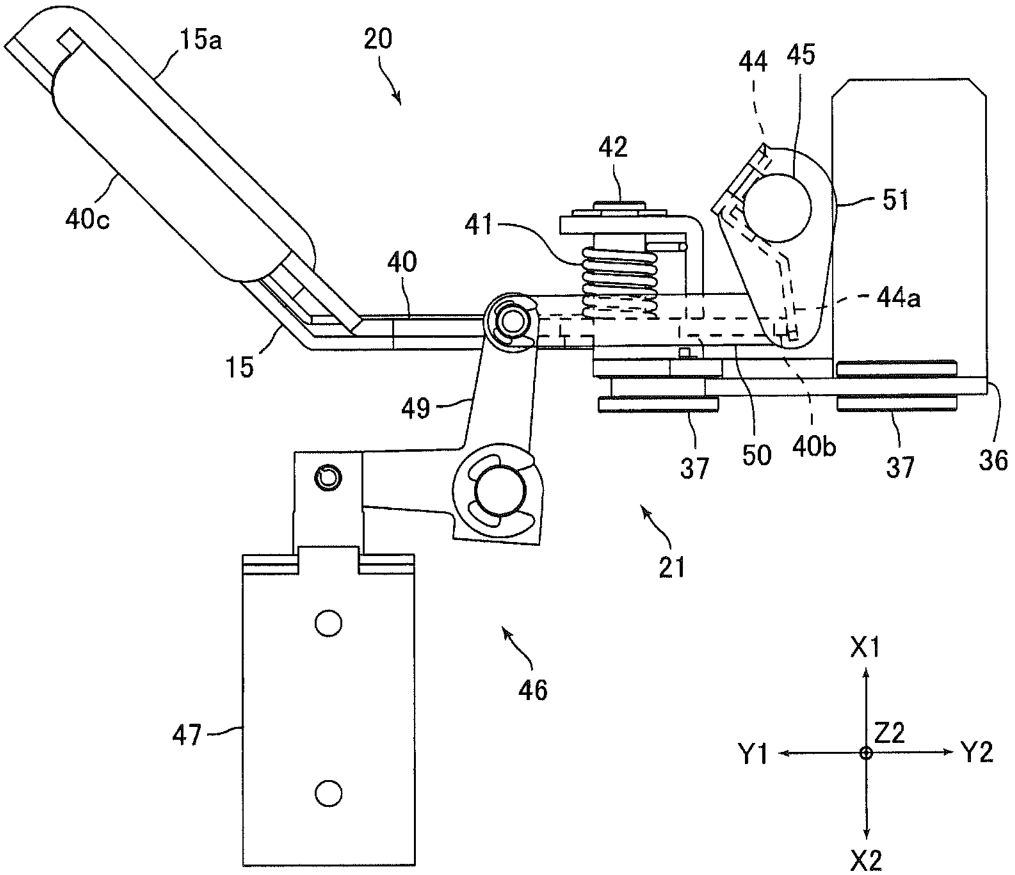

FIG. 13 is a view showing the holding mechanism and a releasing mechanism shown in FIG. 4 which is viewed from a bottom face side.

[FIG. 14]

Figure 7:
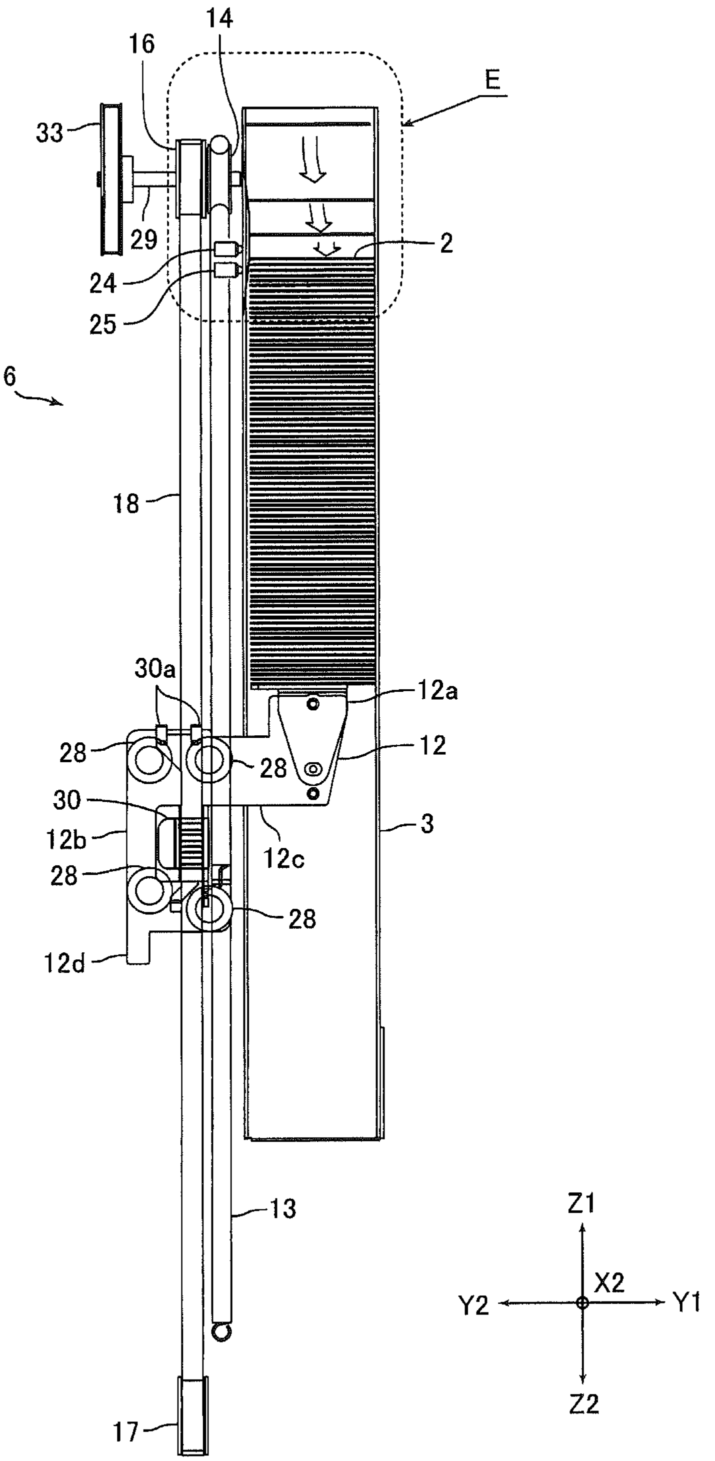
[FIG. 7]
Figure 14:
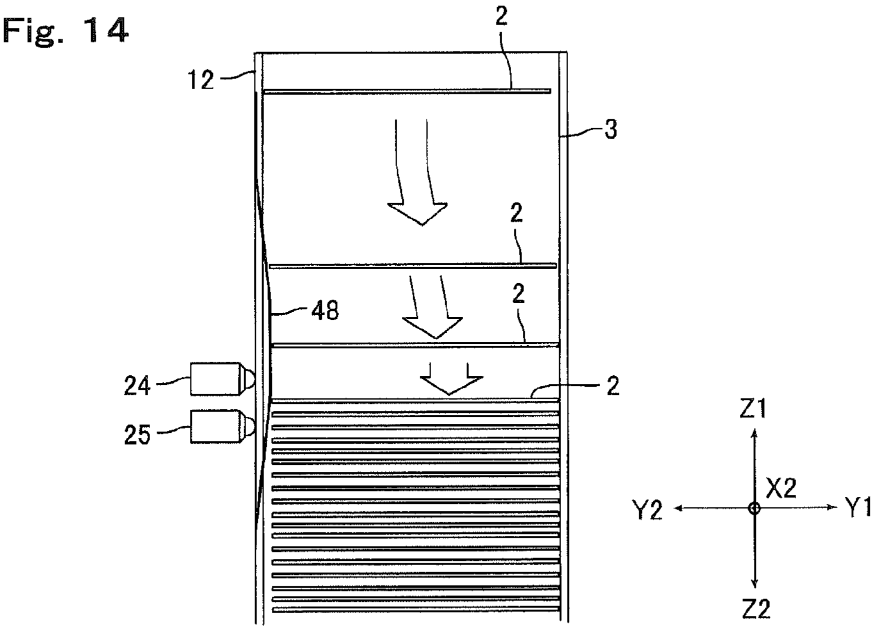

FIG. 14 is an enlarged view showing the “E” part in FIG. 7.

[FIG. 15]

Figure 15:
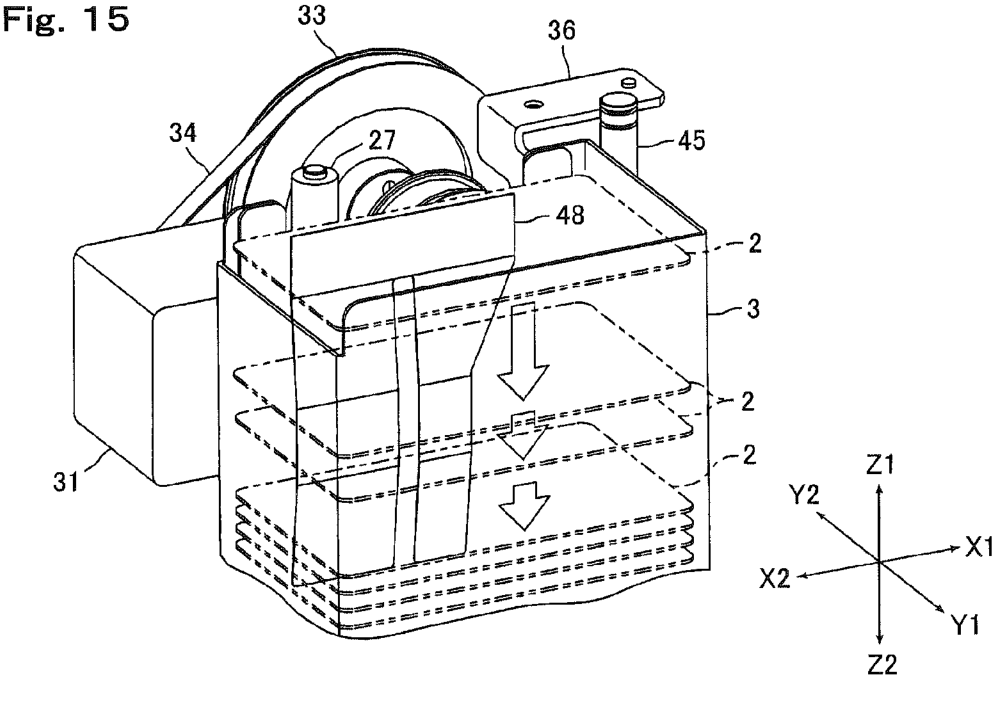

FIG. 15 is an enlarged perspective view showing the “E” part in FIG. 7 which is viewed from an upper side on the left front side.

[FIG. 16]

Figure 16:
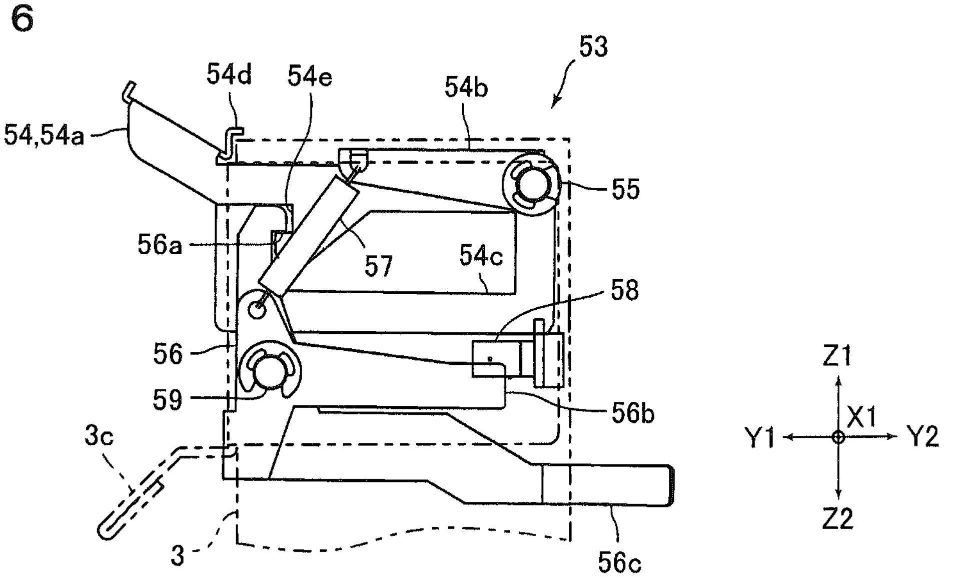

FIG. 16 is a view showing a state where the cartridge holding mechanism shown in FIG. 8 holds the cartridge.

[FIG. 17]

Figure 17:
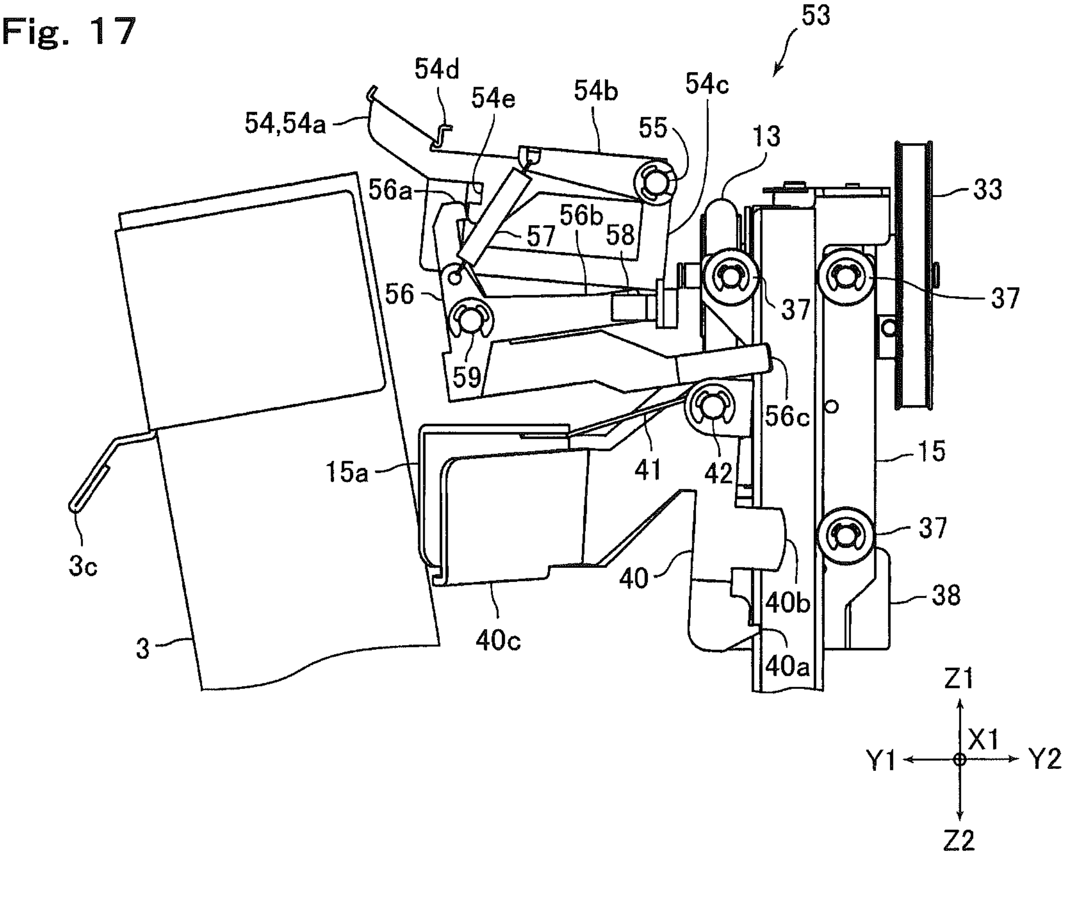

FIG. 17 is a view showing a state where the cartridge holding mechanism shown in FIG. 8 releases the cartridge.

[FIG. 18]

Figure 1:
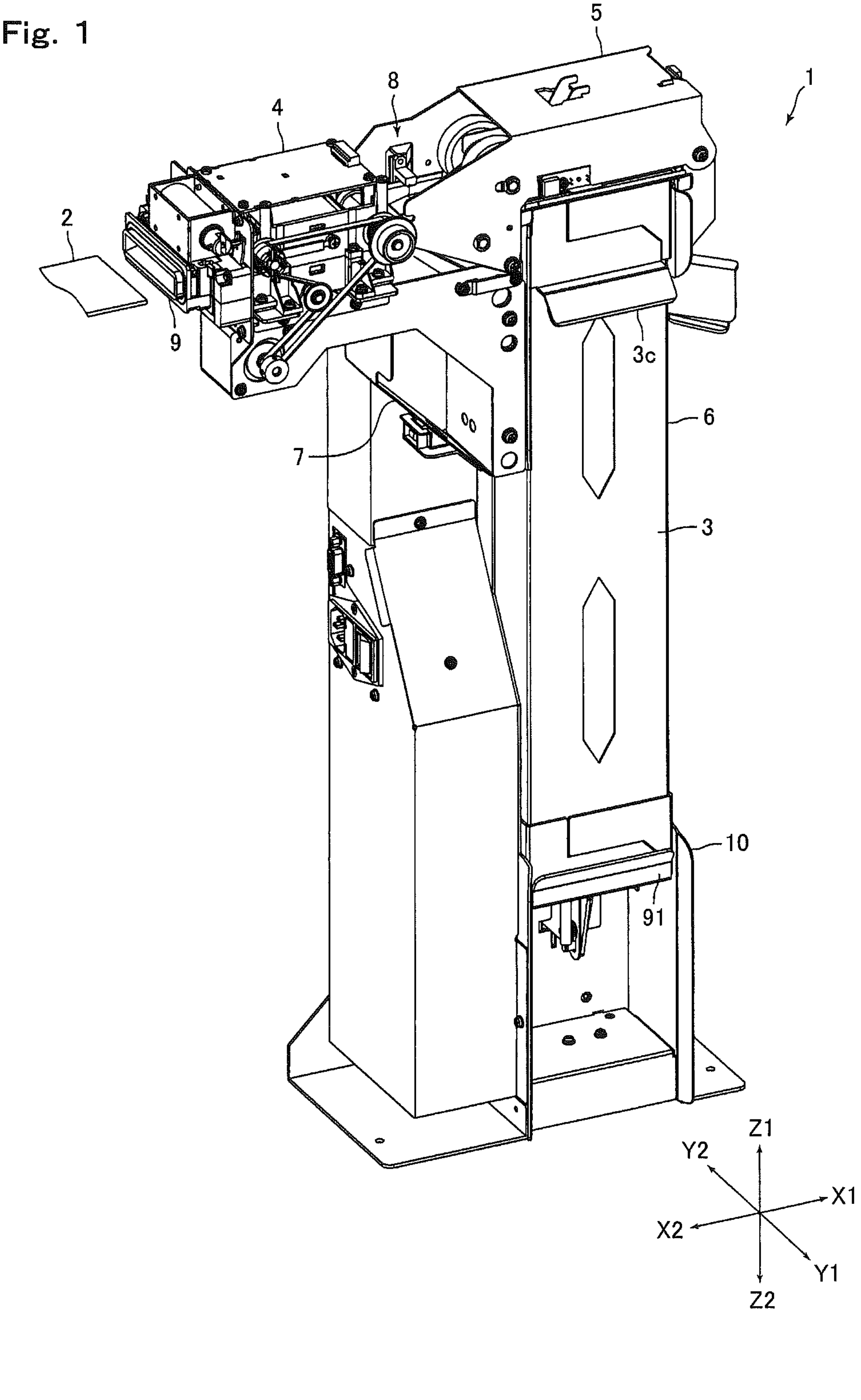
[FIG. 1]
Figure 18:
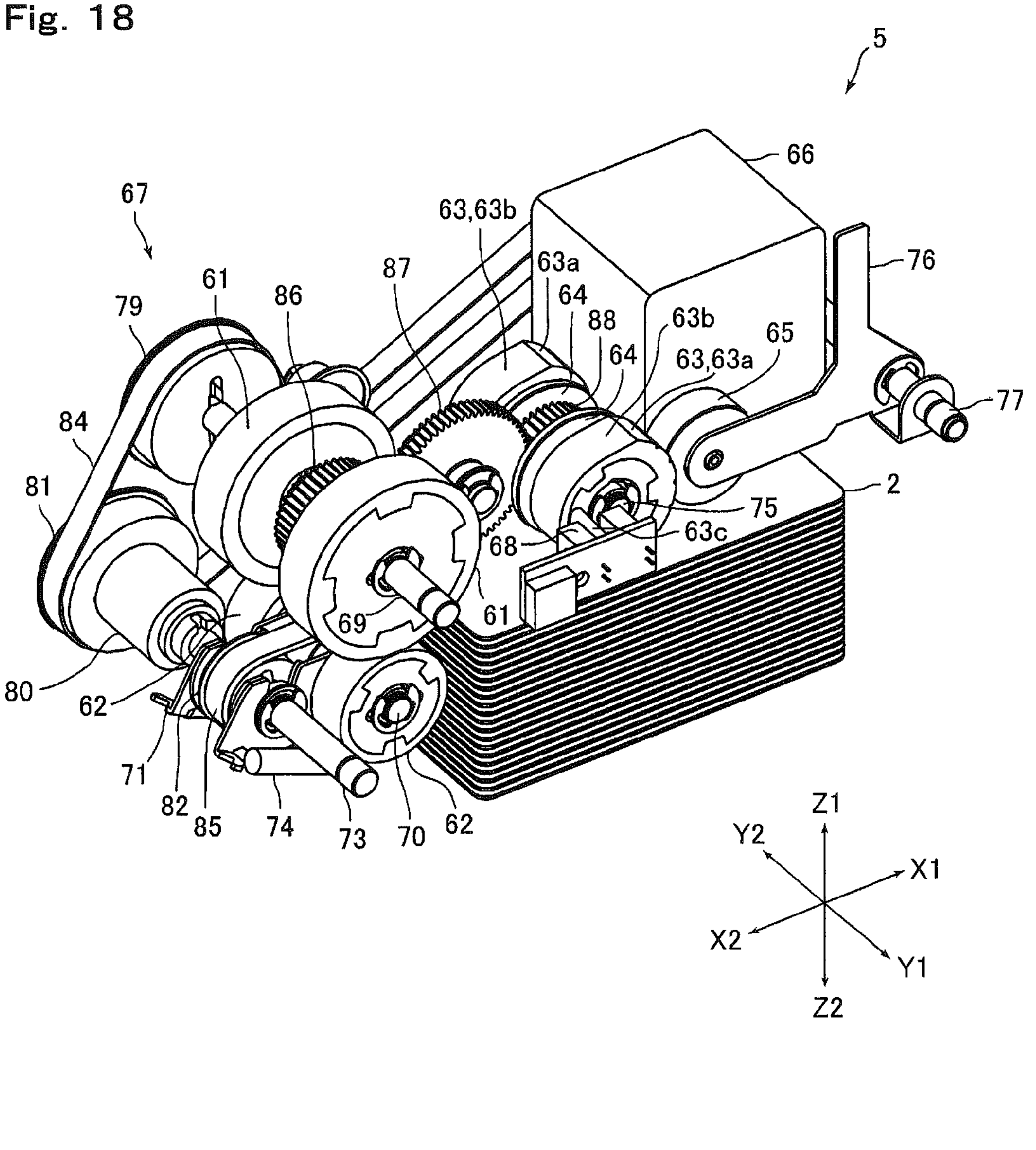

FIG. 18 is a perspective view showing a part of a card carrying-out/carrying-in device shown in FIG. 1.

[FIG. 19]

Figure 19:
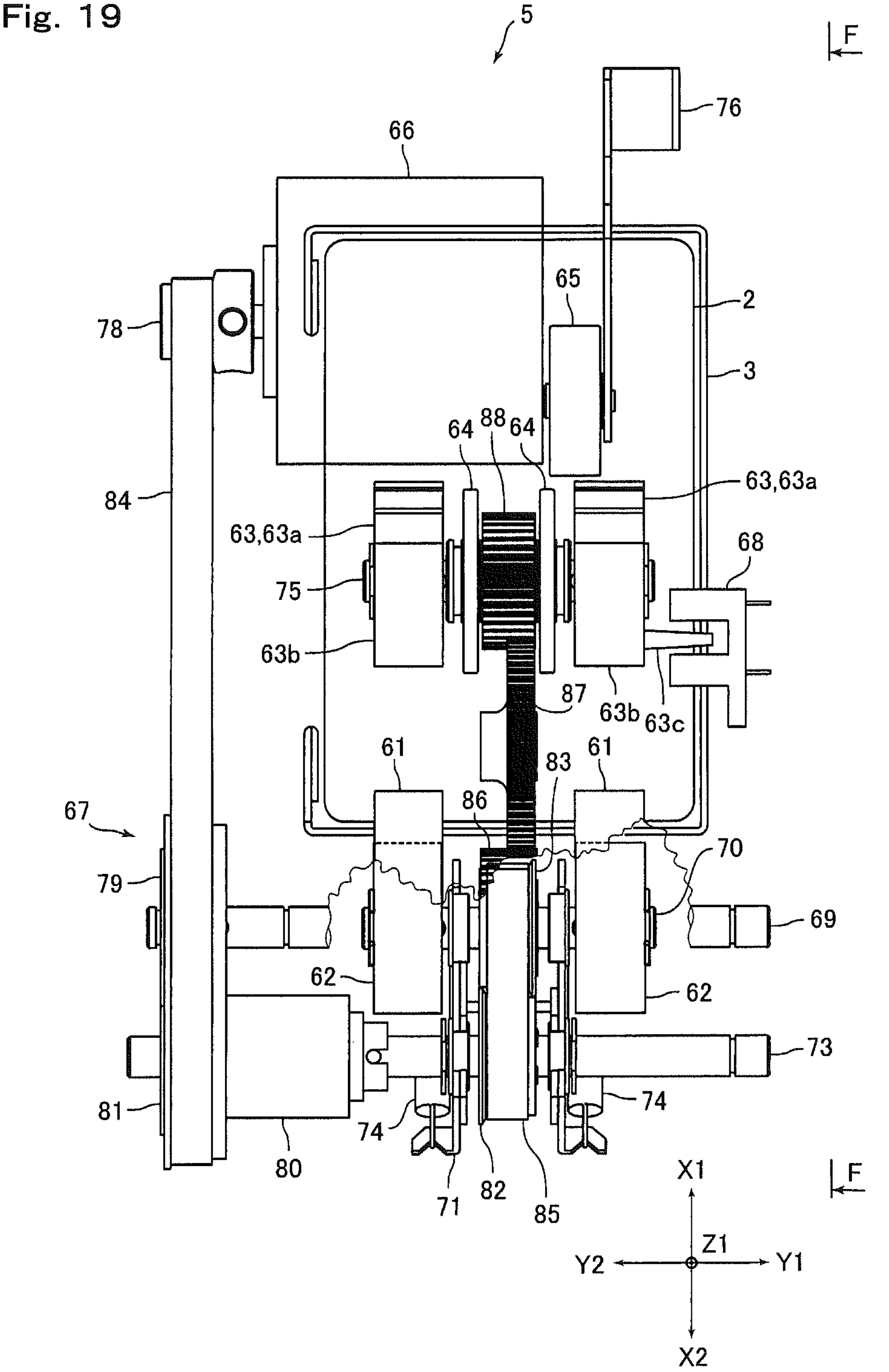

FIG. 19 is a plan view showing a part of the card carrying-out/carrying-in device shown in FIG. 1.

[FIG. 20]

Figure 20:
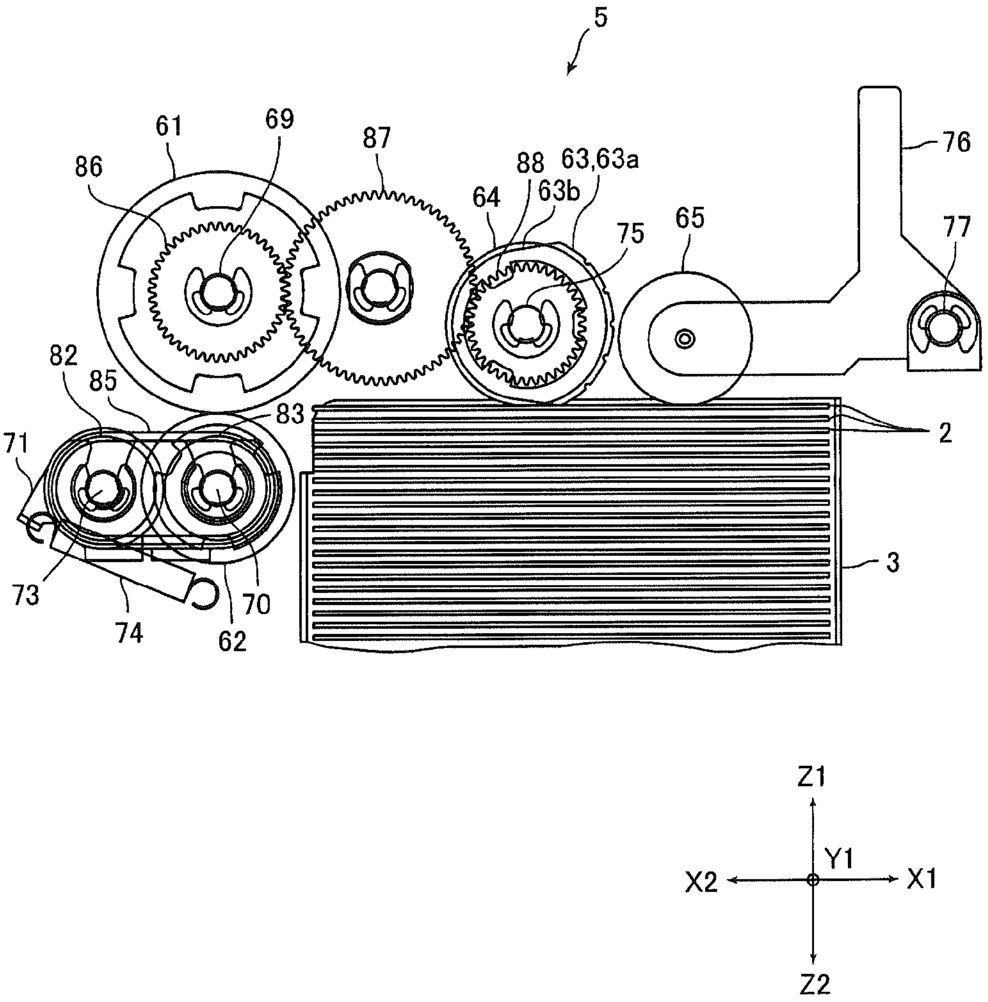

FIG. 20 is a front view showing a schematic structure of a part of the card carrying-out/carrying-in device which is viewed in the “F-F” direction in FIG. 19.

[FIG. 21]

Figure 21:
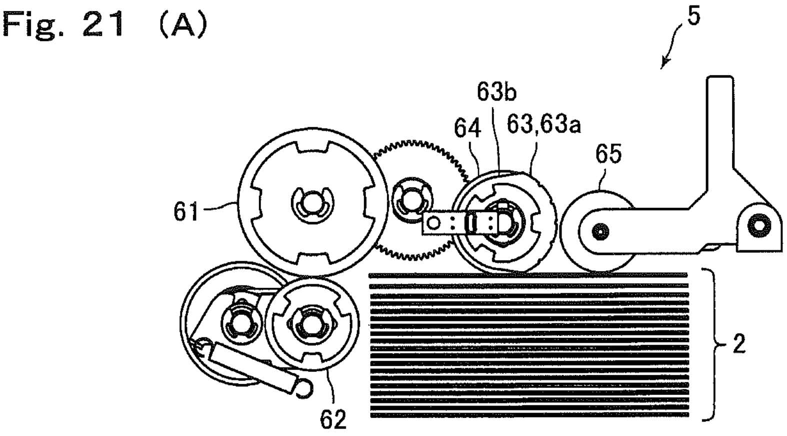
Figure 21:
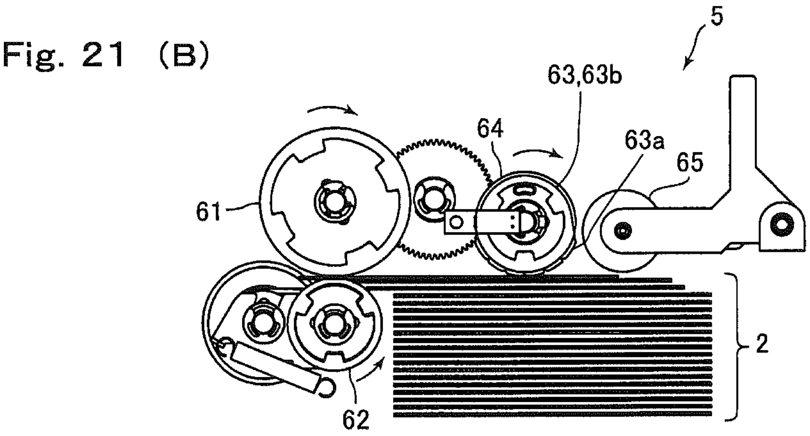
Figure 21:
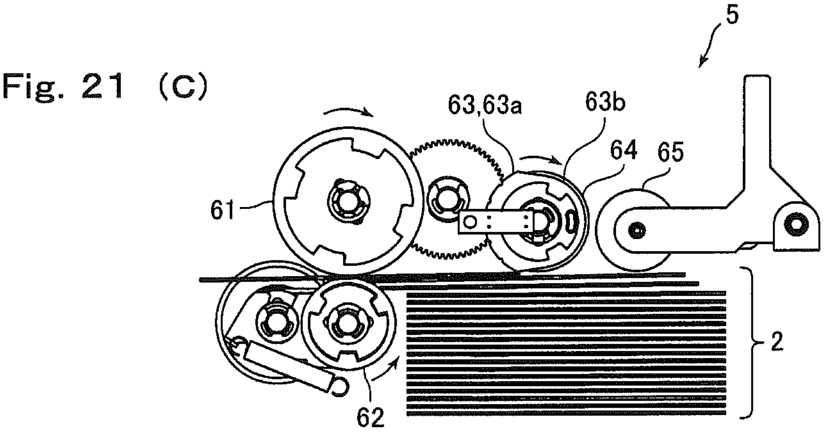

FIGS. 21(A), 21(B) and 21(C) are views for explaining a first half of a carrying-out operation of a card in the card carrying-out/carrying-in device shown in FIG. 18.

[FIG. 22]

Figure 22:
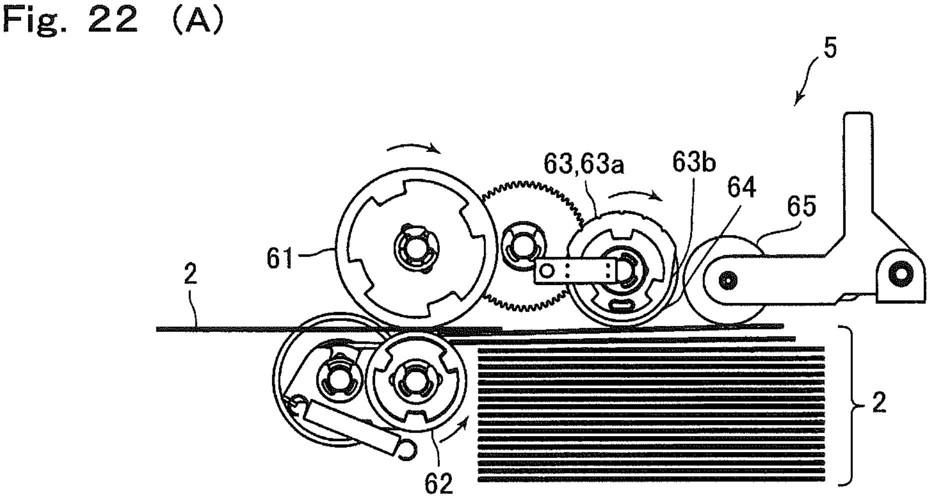
Figure 22:
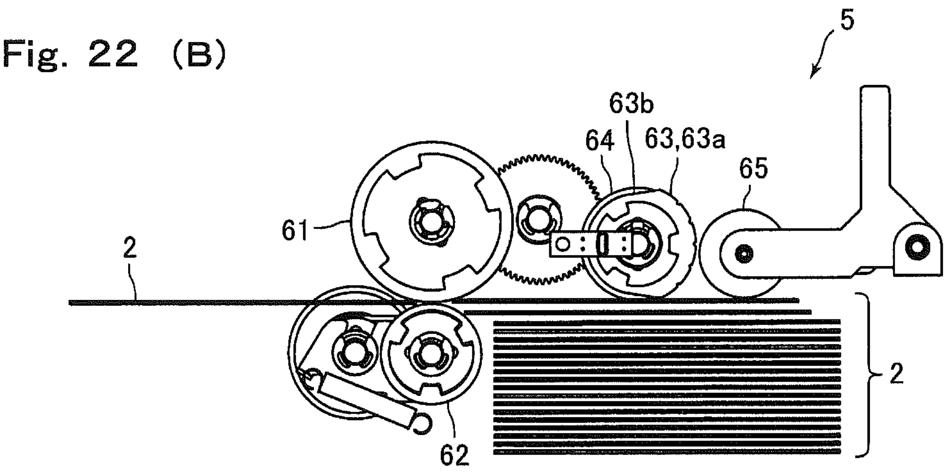

FIGS. 22(A) and 22(B) are views for explaining a latter half of a carrying-out operation of a card in the card carrying-out/carrying-in device shown in FIG. 18.

[FIG. 23]

Figure 23:
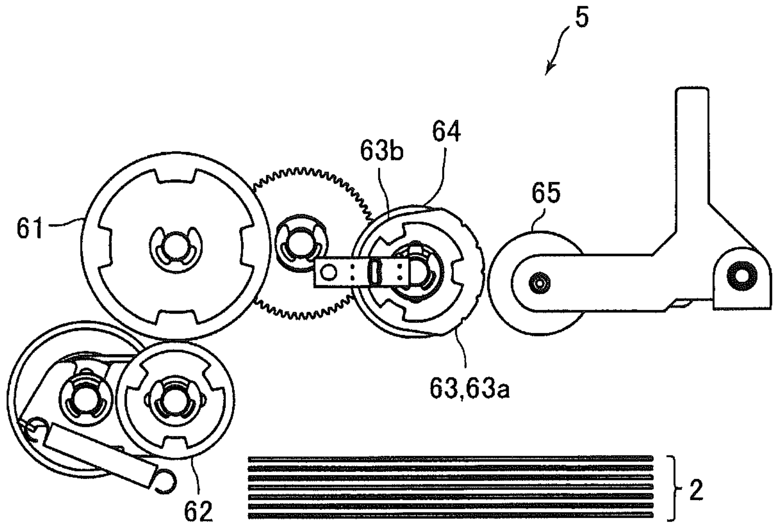
Figure 23:
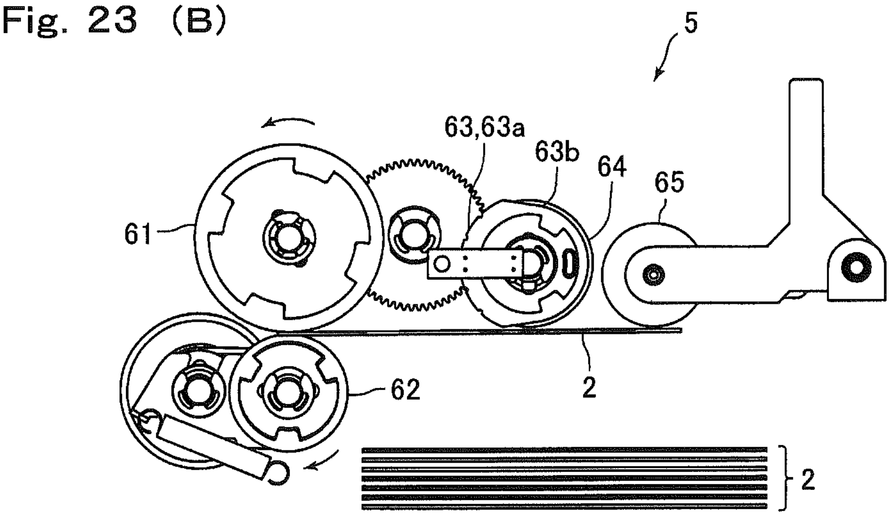

FIGS. 23(A) and 23(B) are views for explaining a carrying-in operation of a card in the card carrying-out/carrying-in device shown in FIG. 18.

DESCRIPTION OF EMBODIMENTS

Embodiments of the present invention will be described below with reference to the accompanying drawings.

[Schematic Structure of Card Issuing/Collecting Apparatus]

Figure 2:
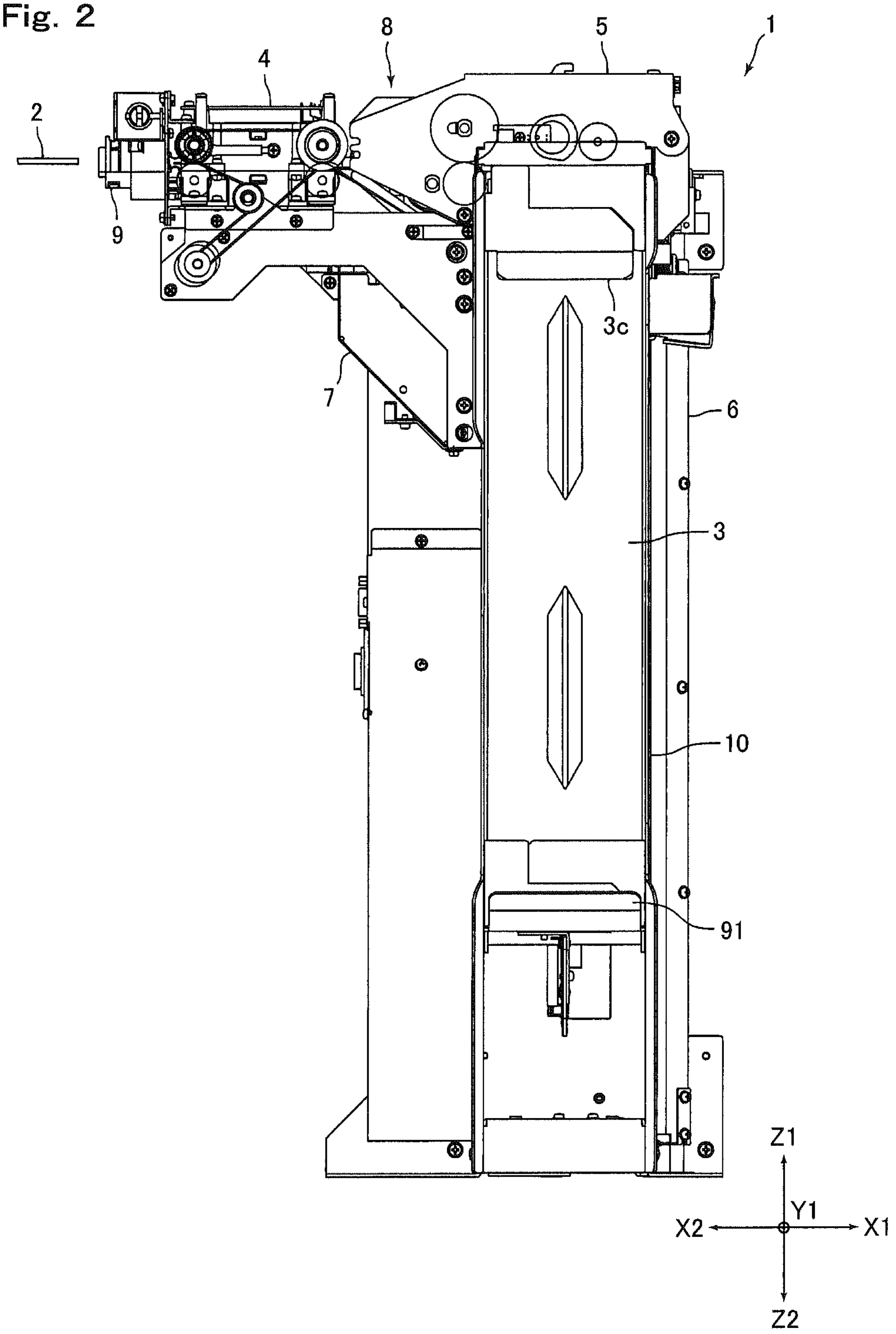
[FIG. 2]
Figure 3:
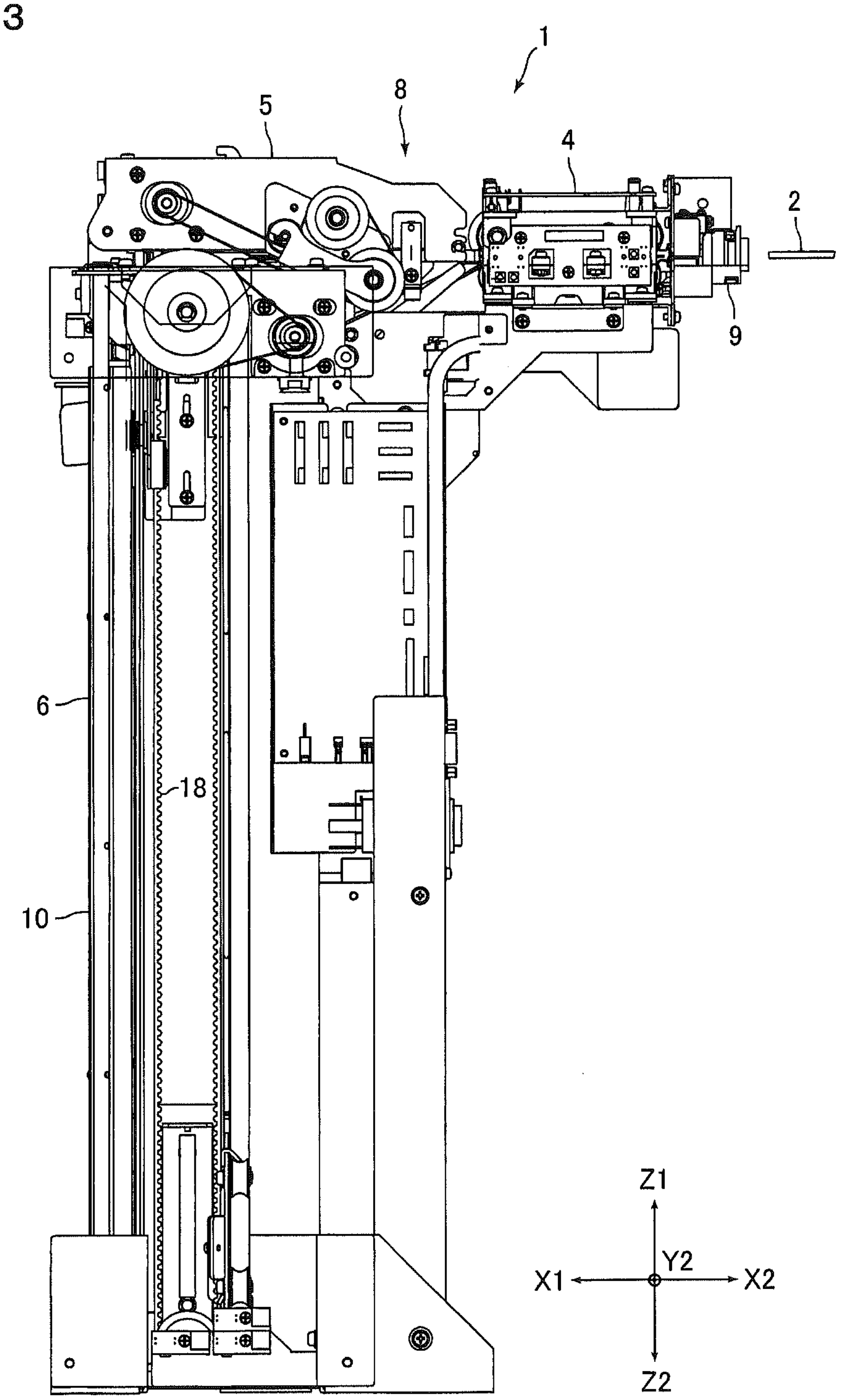
[FIG. 3]

FIG. 1 is a perspective view showing a card issuing/collecting apparatus 1 in accordance with an embodiment of the present invention. FIG. 2 is a front view showing the card issuing/collecting apparatus 1 in FIG. 1. FIG. 3 is a rear view showing the card issuing/collecting apparatus 1 in FIG. 1.

In the following descriptions, in FIGS. 1 through 3, the “X1” direction side is a “right” side, the “X2” direction side is a “left” side, the “Y1 ” direction side is a “front” side, the “Y2” direction side is a “rear” side, the “Z1” direction side is an “upper” side, and the “Z2” direction side is a “lower” side.

A card issuing/collecting apparatus 1 in this embodiment is provided with a card issuing function for issuing a card 2 from a cartridge 3 as a card storage part where cards 2 are stacked and accommodated, and a card collecting function for collecting a card 2 into the cartridge 3 for reusing a card 2 having been issued.

The card issuing/collecting apparatus 1 is, as shown in FIGS. 1 through 3, provided with a card reader 4 for performing reproduction of information recorded on/in a card 2 and/or recording of information on/in a card 2, a card carrying-out/carrying-in device 5 in which a card 2 accommodated in the cartridge 3 is carried out to the card reader 4 and a card 2 is carried toward the cartridge 3 from the card reader 4, and a card elevating/lowering device 6 by which cards 2 accommodated in the cartridge 3 are elevated and lowered. The card elevating/lowering device 6 is disposed on a lower side with respect to the card carrying-out/carrying-in device 5 and the card reader 4 is disposed on the left side with respect to the card carrying-out/carrying-in device 5.

Further, the card issuing/collecting apparatus 1 in this embodiment is provided with a reject card collecting part 7 for collecting a card 2 which is an unnecessary, a used, an error card or the like, and a carrying passage switching device 8 for collecting a card 2 to the reject card collecting part 7. The carrying passage switching device 8 is disposed between the card reader 4 and the card carrying-out/carrying-in device 5. Further, the reject card collecting part 7 is disposed on a lower side with respect to the carrying passage switching device 8.

A card 2 is, for example, a rectangular card made of vinyl chloride whose thickness is about 0.7-0.8 mm. A surface of the card 2 is, for example, formed with a magnetic stripe in which magnetic information is recorded. Further, for example, a surface of the card 2 is fixed with an IC chip. The card 2 may be built in with an antenna for communication. Further, a printing part on which printing is performed by a thermal method may be formed on a surface of the card 2. Further, a card 2 may be a PET (polyethylene terephthalate) card whose thickness is about 0.18-0.36 mm, a paper card having a certain thickness or the like.

The card reader 4 is provided with a card inserting/ejecting part 9 into which a card 2 is inserted or from which a card 2 is ejected, and a card carrying mechanism for carrying a card 2 in the card reader 4. Further, the card reader 4 is provided with a recording and reproducing means for performing recording and reproduction of information such as a magnetic head, IC contacts and/or a communication antenna The reject card collecting part 7 is formed in a box-like shape whose upper end side is opened. The carrying passage switching device 8 is provided with a switching means for passage by which a carrying passage is switched so that a card 2 ejected from the card reader 4 is carried to the card carrying-out/carrying-in device 5 or to the reject card collecting part 7.

[Structure of Card Elevating/Lowering Device]

Figure 6:
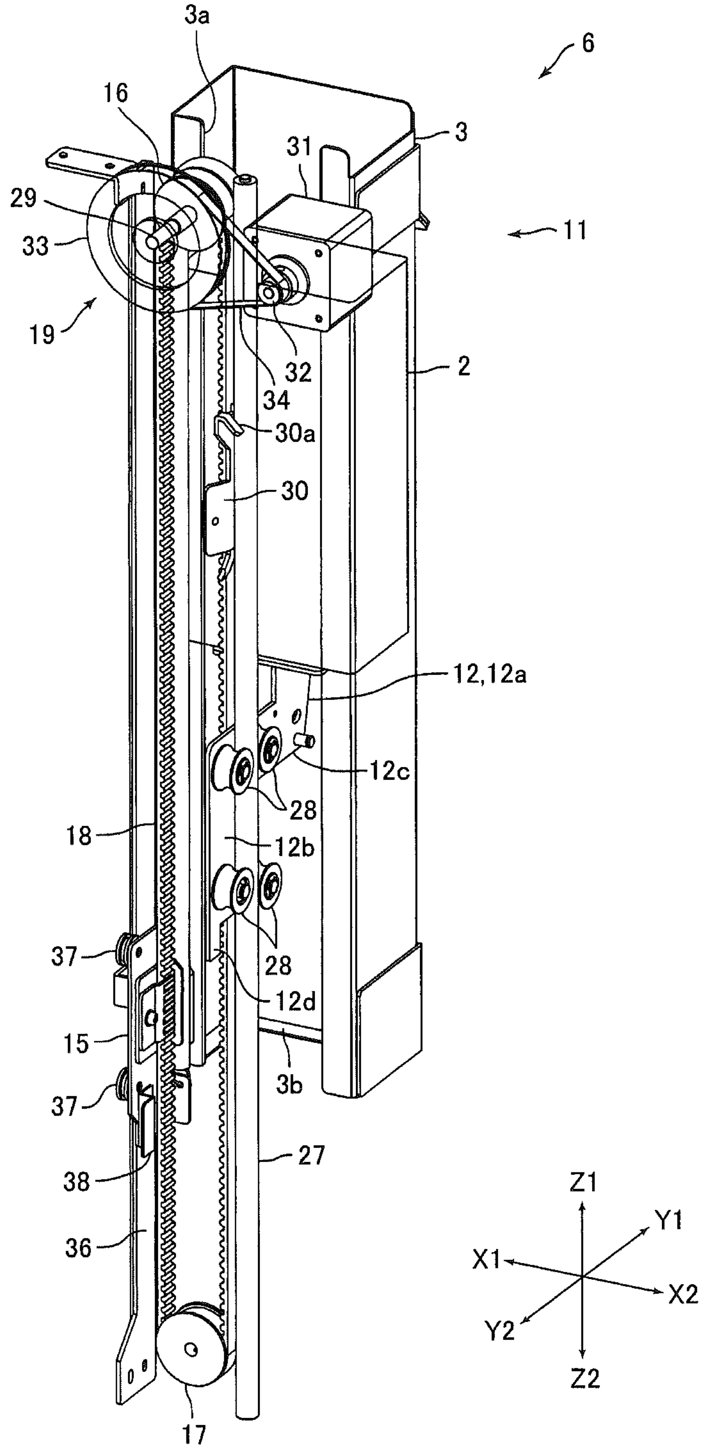
[FIG. 6]

FIG. 4 is a perspective view showing a main part of a card elevating/lowering device 6 shown in FIG. 1 which is viewed from an under side on the right front side. FIG. 5 is a perspective view showing the main part of the card elevating/lowering device 6 shown in FIG. 1 which is viewed from an upper side on the right rear side. FIG. 6 is a perspective view showing the main part of the card elevating/lowering device 6 shown in FIG. 1 which is viewed from an upper side on the left rear side. FIG. 7 is a side view showing a part of the card elevating/lowering device 6 shown in FIG. 1 which is viewed from a left side. FIG. 8 is a perspective view showing a part of the card elevating/lowering device 6 including a cartridge holding mechanism 53 that holds a cartridge 3 shown in FIG. 4 which is viewed from an upper side on the right rear side. FIG. 9 is a perspective view showing a part of the card elevating/lowering device 6 when the cartridge 3 shown in FIG. 4 is to be detached which is viewed from an upper side on the right rear side. FIG. 12 is an enlarged view showing a main part of a holding mechanism 20 shown in FIG. 4. FIG. 14 is an enlarged view showing the "E" part in FIG. 7. FIG. 15 is an enlarged perspective view showing the "E" part in FIG. 7 which is viewed from an upper side on the left front side.

The card elevating/lowering device 6 is provided with a cartridge 3, an elevating/lowering mechanism 11 for elevating and lowering cards 2 accommodated in the cartridge 3, and a cartridge holding mechanism 53 for holding the cartridge 3 at a predetermined position (see FIGS. 8 and 9).

[Structure of Cartridge]

The cartridge 3 is formed in a substantially rectangular tube shape and its upper end and lower end are opened. Further, the cartridge 3 is formed with a passage groove **3*a* from the upper end to the lower end, through which a part of a placing table 12 described below that structures the elevating/lowering mechanism 11 is passed, at an intermediate position in the right and left direction of a rear side face of the cartridge 3. An inner peripheral side of the lower end of the cartridge 3 is formed with an edge part 3*b* for holding cards 2 accommodated in the cartridge 3. The cards 2 are accommodated in the cartridge 3 from the upper end of the cartridge 3. Further, a handle part 3*c* is formed on the front side face of the cartridge 3**.

The cartridge 3 in this embodiment is detachable from a main body frame 10 of the card elevating/lowering device 6 (see FIG. 1). Specifically, as shown in FIGS. 8 and 9, the cartridge 3 is held by the cartridge holding mechanism 53 which is disposed on the upper end side in a state that the cartridge 3 is placed on a cartridge support part 91 that is turnably supported by the main body frame 10. When the cartridge holding mechanism 53 is released, the cartridge 3 is capable of being detached from the main body frame 10.

The cartridge support part 91 is turnably supported by the main body frame 10 with its lower end side as a supporting point so as to be turnable with the right and left direction as an axial direction. As shown in FIG. 9, when the cartridge support part 91 is inclined to the front side with its lower end side as a supporting point, the cartridge 3 is capable of being detached from the main body frame 10. Further, as shown in FIG. 8, a placing face of the cartridge support part 91 on which the cartridge 3 is placed is formed with an opening part **91*a* through which the placing table 12** is capable of being passed.

[Structure of Elevating/Lowering Mechanism]

FIGS. 10(A) and 10(B) are perspective views showing a part of an elevating/lowering mechanism 11 shown in FIG. 4. FIG. 11(A) is a view showing a hanging tool 30 shown in FIG. 5 which is viewed from a rear side, and FIG. 11(B) is a view showing the hanging tool 30 shown in FIG. 5 which is viewed from a left side. FIG. 12 is an enlarged view showing a main part of a holding mechanism 20 shown in FIG. 4. FIG. 13 is a view showing the holding mechanism 20 and a releasing mechanism 21 shown in FIG. 4 which is viewed from a bottom face side. FIG. 14 is an enlarged view showing the "E" part in FIG. 7. FIG. 15 is an enlarged perspective view showing the "E" part in FIG. 7 which is viewed from an upper side on the left front side.

The elevating/lowering mechanism 11 is provided with the placing table 12 on which cards 2 accommodated in the cartridge 3 are placed and a tension coil spring 13 as an urging member for urging the placing table 12 in an upper direction. As shown in FIG. 10(B), one end of the tension coil spring 13 is attached to the placing table 12. Further, the tension coil spring 13 is hanged over a pulley 14 which is disposed on the upper end side of the card elevating/lowering device 6.

The other end of the tension coil spring 13 is, as shown in FIG. 4, attached to an elevating/lowering member 15 as a spring end fixing member. The elevating/lowering member 15 is fixed to a belt 18, which is stretched over a pulley 16 disposed on an upper end side of the card elevating/lowering device 6 and a pulley 17 disposed on a lower end side of the card elevating/lowering device 6 and thus the elevating/lowering member 15 is capable of moving up and down. As described above, since one end of the tension coil spring 13 is attached to the placing table 12 and the other end of the tension coil spring 13 is attached to the elevating/lowering member 15, when the belt 18 is moved to make the elevating/lowering member 15 move down, the placing table 12 is moved upward in the opposite direction to the elevating/lowering member 15.

Further, the elevating/lowering mechanism 11 is provided with a drive mechanism 19 for driving the pulley 16 disposed on the upper end side, a holding mechanism 20 for holding a position of the elevating/lowering member 15 in the up-and-down direction, and a releasing mechanism 21 for releasing a holding state of the elevating/lowering member 15 by the holding mechanism 20 so that the elevating/lowering member 15 is capable of being elevated and lowered.

In addition, the elevating/lowering mechanism 11 is provided with a sensor 22 (see FIG. 5) for detecting a state that the placing part 12 is located at a lower limit (in other words, cards 2 in the cartridge 3 are in a full state), a sensor 23 (see FIG. 5) for detecting a state that the elevating/lowering member 15 is located at a lower limit, and sensors 24 and 25 (see FIG. 7) as a detection mechanism for detecting a state that a card at the highest (uppermost) position of cards 2 stacked in the cartridge 3 is located at a predetermined position.

The placing table 12 is, as shown in FIGS. 10(A) and 10(B), movable in the up-and-down direction along a guide shaft 27 which is fixed to the main body frame 10 with the up-and-down direction as an axial direction and cards 2 placed on the placing table 12 are elevated and lowered in the inside of the cartridge 3. The placing table 12 is rotatably attached with a plurality of guide rollers 28 which are engaged with the guide shaft 27 for guiding the placing table 12 in the up-and-down direction.

The placing table 12 is, as shown in FIG. 10(A), structured of a placing part 12*a* which is disposed in an inside of the cartridge 3, a roller attaching part 12*b* which is disposed on the outer side of the cartridge 3 and to which the guide rollers 28 are attached, and a connection part 12*c* which connects the placing part 12*a* with the roller attaching part 12*b*. The connection part 12*c* is disposed to pass through the passage groove 3*a* of the cartridge 3. A lower end of the roller attaching part 12*b* is formed with a detecting part 12*d* for detecting a state together with the sensor 22 that the placing table 12 is located at the lower limit. Further, one end of the tension coil spring 13 is attached to the roller attaching part 12*b*.

The tension coil spring 13 is formed so that its spring constant is substantially equal to a weight per unit thickness of the card 2.

The pulley 14 for spring is rotatably supported by a rotation shaft 29 to which the pulley 16 is fixed through a bearing (not shown). The pulleys 16 and 17 for belt are a toothed pulley whose outer peripheral face is formed with a plurality of teeth. Further, the pulley 17 disposed on the lower end side is a tension pulley for applying a predetermined tension to the belt 18. The belt 18 is a toothed belt whose inner peripheral face is formed with a plurality of teeth. The belt 18 is fixed with the hanging tool 30 for forcibly moving the placing table 12 downward. Specifically, as shown in FIGS. 5 and 6, the hanging tool 30 is fixed to the belt 18 so that the hanging tool 30 is disposed on an upper side with respect to the placing table 12.

As shown in FIGS. 11(A) and 11(B), two pawl parts 30*a* which are engaged with an upper end of the roller attaching part 12*b* of the placing table 12 are formed on an upper end side of the hanging tool 30. Further, a lower end side of the hanging tool 30 is a belt fixing part 30*b* which is fixed to the belt 18.

The drive mechanism 19 is provided with a motor 31, a pulley 32 fixed to an output shaft of the motor 31, a pulley 33 which is fixed to a rear side end of the rotation shaft 29, and a belt 34 stretched over the pulleys 32 and 33. In this embodiment, when the motor 31 is driven, power is transmitted to the belt 18 and the elevating/lowering member 15 and the hanging tool 30 fixed to the belt 18 are moved up or down.

The elevating/lowering member 15 is movable in the up-and-down direction along a long and thin guide plate 36 which is fixed to the main body frame 10 with the up-and-down direction as its longitudinal direction. The elevating/lowering member 15 is rotationally attached with a plurality of guide rollers 37 which are engaged with both side faces of the guide plate 36 for guiding the elevating/lowering member 15 in the up-and-down direction. Further, a lower end side of the elevating/lowering member 15 is attached with a detecting plate 38 for detecting a state together with the sensor 23 that the elevating/lowering member 15*a* is located at the lower limit. In addition, the elevating/lowering member 15 is formed with a handle part 15*a* which is protruded toward a front side and one end side of a torsion coil spring 41 described below is engaged with the handle part 15*a* (see FIG. 12).

The holding mechanism 20 is, as shown in FIG. 12, provided with a rack 39 formed in a long and thin plate shape which is formed with a plurality of rack teeth 39*a*, and a latch lever 40 which is formed with an engagement pawl 40*a* which is engaged with the rack tooth 39*a*. The rack 39 is fixed to the guide plate 36 with the up-and-down direction as a longitudinal direction. The latch lever 40 is turnably attached to the elevating/lowering member 15. Specifically, as shown in FIGS. 12 and 13, the latch lever 40 is turnably supported by a fixed shaft 42 which is fixed to the elevating/lowering member 15 with the right and left direction as an axial direction.

Further, the latch lever 40 is urged to the elevating/lowering member 15 by the torsion coil spring 41 which is held by the fixed shaft 42 in a direction so that the rack tooth 39*a* and the engagement pawl 40*a* are engaged with each other. Specifically, one end side of the torsion coil spring 41 is engaged with the handle part 15*a* of the elevating/lowering member 15 from a lower side and the other end side of the torsion coil spring 41 is engaged with the latch lever 40 on the rear side of the fixed shaft 42 from a lower side. Therefore, the latch lever 40 is urged in a counterclockwise direction in FIG. 12. In this embodiment, a position of the elevating/lowering member 15 in the up-and-down direction is held by means of that the rack tooth 39*a* and the engagement pawl 40*a* are engaged with each other. In this embodiment, the torsion coil spring 41 is an engagement pawl urging member which urges the engagement pawl 40*a* toward the rack teeth 39*a*.

The latch lever 40 is formed with a protruded part 40*b* for releasing engagement of the rack tooth 39*a* with the engagement pawl 40*a* Further, the latch lever 40 is formed with a handle part 40*c* which is protruded toward the front side. The handle part 40*c* is disposed so as to superpose on the handle part 15*a* of the elevating/lowering member 15 in the up-and-down direction.

The releasing mechanism 21 is provided with a releasing member 44 which is abutted with the protruded part 40*b* to move the engagement pawl 40*a* in a direction for releasing engagement of the rack tooth 39*a* with the engagement pawl 40*a* The releasing member 44 is fixed to a turning shaft 45 which is turnably supported by the main body frame 10 with the up-and-down direction as an axial direction. Further, as shown in FIG. 4, a turning mechanism 46 is connected with the turning shaft 45 for turning the releasing member 44 together with the turning shaft 45.

The releasing member 44 is formed in a long and thin plate shape with the up-and-down direction as a longitudinal direction. The releasing member 44 is, as shown in FIG. 13, formed with an abutting part 44*a* which is abutted with the protruded part 40*b*. The abutting part 44*a* is formed in an elongated shape which is longer in the up-and-down direction so that the latch lever 40 attached to the elevating/lowering member 15 is abutted with the protruded part 40*b* at any position in the up-and-down direction.

The turning mechanism 46 is connected with the lower end side of the turning shaft 45. The turning mechanism 46 is, as shown in FIG. 13, provided with a solenoid 47 as a drive source, lever members 49 and 50, and a connecting plate 51. The lever member 49 is formed in a roughly "L"-shape and turnable with its center part as a supporting point. One end of the lever member 49 is turnably attached to a plunger of the solenoid 47. The lever member 50 is formed in a straight line shape and its one end is turnably attached to the other end of the lever member 49. The connecting plate 51 is fixed to the lower end side of the turning shaft 45. The connecting plate 51 is turnably attached with the other end of the lever member 50.

In this embodiment, when the solenoid 47 is driven, the releasing member 44 is turned with the up-and-down direction as an axial direction. When the releasing member 44 is turned, the protruded part 40*b* abutted with the abutting part 44*a* is pressed by the abutting part 44*a* and thus, as shown in FIG. 12, the latch lever 40 is turned in the clockwise direction in FIG. 12 against an urging force of the torsion coil spring 41. When the latch lever 40 is turned, as shown by the two-dot chain line in FIG. 12, engagement of the rack tooth 39*a* with the engagement pawl 40*a* is released and thus elevating or lowering of the elevating/lowering member 15 can be performed.

In this embodiment, when a user grasps the handle parts 15*a* and 40*c* in the up-and-down direction, the latch lever 40 is turned in a direction in which engagement of the rack tooth 39*a* with the engagement pawl 40*a* is released against an urging force of the torsion coil spring 41 (in other words, in the clockwise direction in FIG. 12). In other words, in this embodiment, engagement of the rack tooth 39*a* with the engagement pawl 40*a* can be also released by manual operation.

The sensors 22 and 23 are, as shown in FIG. 5, disposed on the lower end side of the card elevating/lowering device 6. The sensor 22 is a transmission type optical sensor in which a light emitting element and a light receiving element are disposed so as to face each other. When the detecting part 12*d* of the placing table 12 blocks between the light emitting element and the light receiving element, the placing table 12 is detected to be at the lower limit The sensor 23 is, similarly to the sensor 22, a transmission type optical sensor and, when the detecting plate 38 blocks between the light emitting element and the light receiving element, the elevating/lowering member 15 is detected to be at the lower limit.

The sensors 24 and 25 are a reflection type optical sensor in which a light emitting element and a light receiving element are adjacently disposed to each other. The sensors 24 and 25 are, as shown in FIG. 14, disposed on an upper end side of the card elevating/lowering device 6 in a separated state with a predetermined space in the up-and-down direction between them. Further, the sensors 24 and 25 are disposed so that a light beam from the light emitting element is passed through the passage groove 3*a* of the cartridge 3.

In this embodiment, when a card 2 is to be carried into the cartridge 3 from the card reader 4, a card 2 at the highest position in the cartridge 3 is set to be disposed between the sensor 24 and the sensor 25 in the up-and-down direction by utilizing the sensors 24 and 25. In other words, the elevating/lowering member 15 is elevated or lowered and the placing table 12 is lowered or elevated so that the sensor 24 disposed on the upper side does not detect a card 2 and the sensor 25 disposed on the lower side detects a card 2. In this embodiment, as shown in FIG. 14, a predetermined space is formed between the uppermost card 2 which is disposed between the sensor 24 and the sensor 25 in the up-and-down direction and the upper end of cartridge 3. The space is an accommodating space for accommodating a card 2 in the cartridge 3.

A flat spring 48 is fixed to the upper end side of the main body frame 10 as shown in FIGS. 14 and 15. Specifically, the flat spring 48 is fixed to the main body frame 10 so that a part of the flat spring 48 is protruded into the inside of the cartridge 3 from the passage groove 3*a* of the cartridge 3. More specifically, the flat spring 48 is fixed so that a part of the flat spring 48 is protruded into the inside of the cartridge 3 over an upward narrow range from the mounting positions of the sensors 24 and 25. The flat spring 48 is provided with a function for abutting with a card 2 which is dropped from an upper side of the cartridge 3 into its inside when the card is carried into the inside of the cartridge 3 and for shifting the dropping card 2 to the front side of the cartridge 3.

In this embodiment, a spring force of the flat spring 48 is set to be capable of shifting a card 2 abutting with the flat spring 48 to the front side against a frictional resistance between stacked cards 2. Further, the spring force of the flat spring 48 is set so that, even when a rear end of a dropping card 2 is abutted with the flat spring 48, the dropping of the card 2 is not disturbed.

In the card elevating/lowering device 6 structured as described above, when a card 2 is to be carried out toward the card reader 4 from the cartridge 3, the placing table 12 is moved upward so that support rollers 64 and 65 (see FIG. 20) described below which structure the card carrying-out/carrying-in device 5 are abutted with a card 2 located at the highest position in the cartridge 3 with a predetermined abutting force. In other words, after the solenoid 47 is driven to set an elevating/lowering operation of the elevating/lowering member 15 in a permitted state, the motor 31 is activated. When the motor 31 is activated, the elevating/lowering member 15 is moved down and the placing table 12 is moved upward.

Further, when a card 2 is to be carried into the cartridge 3 from the card reader 4, the placing table 12 is moved down so that the uppermost card 2 at the highest position in the cartridge 3 is disposed between the sensor 24 and the sensor 25 and an accommodating space for a card 2 is formed in the cartridge 3. In other words, after the solenoid 47 is driven to set an elevating/lowering operation of the elevating/lowering member 15 in a permitted state, the motor 31 is activated. When the motor 31 is activated, the elevating/lowering member 15 is moved upward and the placing table 12 is moved down.

After the elevating/lowering member 15 has been moved down so that the card 2 at the highest position in the cartridge 3 is abutted with the support rollers 64 and 65 with a predetermined abutting force and, alternatively, after the elevating/lowering member 15 has been moved upward so that an accommodating space for a card 2 is formed in the cartridge 3, the holding mechanism 20 is operated to hold the position of the elevating/lowering member 15.

Further, in this embodiment, when the cartridge 3 is to be detached from the main body frame 10, the placing table 12 is forcibly moved down so that the placing part 12*a* of the placing table 12 is come out from the inside of the cartridge 3 to be disposed on an under side of the cartridge 3. Specifically, after the solenoid 47 is driven to set an elevating/lowering operation of the elevating/lowering member 15 in a permitted state, the motor 31 is activated to move the hanging tool 30 downward and the placing table 12 is forcibly moved down together with the hanging tool 30.

In this embodiment, the spring constant of the tension coil spring 13 is, as described above, substantially equal to a weight per unit thickness of the card 2. Therefore, when a card 2 is carried out, the tension coil spring 13 is contracted by the number of sheets of the card 2 carried out from the cartridge 3 and cards 2 are moved upward together with the placing table 12. Therefore, even when the position of the elevating/lowering member 15 is not changed, a card 2 at the highest position in the cartridge 3 is always abutted with the support rollers 64 and 65 with a substantially constant abutting force. Further, when a card 2 is carried into the inside, the tension coil spring 13 is extended by the number of sheets of the card 2 carried into the cartridge 3 and cards 2 are moved down together with the placing table 12. Therefore, even when the position of the elevating/lowering member 15 is not changed, the position of the uppermost card 2 at the highest position is always located between the sensor 24 and the sensor 25.

After the elevating/lowering member 15 has been moved down so that the card 2 at the highest position in the cartridge 3 is abutted with the support rollers 64 and 65 with a predetermined abutting force and, alternatively, after the elevating/lowering member 15 has been moved upward so that an accommodating space for a card 2 is formed in the cartridge 3, the holding mechanism 20 is operated to hold the position of the elevating/lowering member 15. Further, when an elevating/lowering operation of the elevating/lowering member 15 is to be performed, the releasing mechanism 21 is operated and an elevating/lowering operation of the elevating/lowering member 15 is permitted.

Further, in this embodiment, when the cartridge 3 is to be detached from the main body frame 10, the placing table 12 is forcibly moved down so that the placing part 12*a* of the placing table 12 is come out from the inside of the cartridge 3 to be disposed on an under side of the cartridge 3. Specifically, the motor 31 is activated to move the hanging tool 30 downward and the placing table 12 is forcibly moved down together with the hanging tool 30. In this embodiment, in order that the cartridge 3 is not carelessly detached from the main body frame 10 when the placing table 12 is located in the inside of the cartridge 3, the cartridge 3 is locked by an erroneous operation prevention lock mechanism. A locked state of the cartridge 3 by the erroneous operation prevention lock mechanism is released in association with a forcible downward movement of the placing table 12 by the hanging tool 30.

[Structure of Cartridge Holding Mechanism]

FIG. 16 is a view showing a state where the cartridge holding mechanism 53 shown in FIG. 8 holds the cartridge 3. FIG. 17 is a view showing a state where the cartridge holding mechanism 53 shown in FIG. 8 releases the cartridge 3.

The cartridge holding mechanism 53 is, as shown in FIGS. 8 and 16 and the like, provided with a lock lever 54 which holds an upper end side of the cartridge 3 that is set in the main body frame 10. The lock lever 54 is turnably supported by a fixed shaft 55 which is disposed on the rear end side. The fixed shaft 55 is fixed to the main body frame 10 with the right and left direction as an axial direction. In this embodiment, as shown in FIG. 16, a state that the lock lever 54 is engaged with the front side of the cartridge 3 is a holding state of the cartridge 3 by the cartridge holding mechanism 53. Further, when the lock lever 54 is turned from the holding state in a clockwise direction in FIG. 16, a releasing state is attained in which the cartridge 3 is capable of being detached from the main body frame 10 (see FIG. 17).

Further, the cartridge holding mechanism 53 is provided with a malfunction preventing lever 56 which is engaged with the lock lever 54 to prevent malfunction of the lock lever 54 in order that the cartridge 3 is not detached from the main body frame 10 in an operating state of the card elevating/lowering device 6 where the placing part 12*a* of the placing table 12 is disposed in the inside of the cartridge 3. In addition, the cartridge holding mechanism 53 is provided with a tension coil spring 57, which urges the lock lever 54 and the malfunction preventing lever 56 in directions so that the lock lever 54 and the malfunction preventing lever 56 are engaged with each other, and a sensor 58 for detecting a state that an engagement state of the lock lever 54 with the malfunction preventing lever 56 has been released.

The lock lever 54 is provided with a handle part 54*a* which is disposed on the front end, a right side face part 54*b* which is formed from the right end of the handle part 54*a* toward the rear side, and a left side face part 54*c* which is formed from the left end of the handle part 54*a* toward the rear side. The fixed shaft 55 is inserted into the rear end of the right side face part 54*b* and the rear end side of the left side face part 54*c*. A rear end of the handle part 54*a* is formed with a detachment prevention piece 54*d* which prevents an upward detachment of the cartridge 3. The right side face part 54*b* is formed with an engaging recessed part 54*e*, which is engaged with an engagement protruded part 56*a* formed in the malfunction preventing lever 56, so as to be recessed toward the rear side. Further, one end of the tension coil spring 57 is attached to the right side face part 54*b*.

The malfunction preventing lever 56 is turnably supported by a fixed shaft 59 which is fixed to the main body frame 10 with the right and left direction as an axial direction. The malfunction preventing lever 56 is provided with the engagement protruded part 56*a* which is engaged with the recessed part 54*e* of the lock lever 54, a detecting part 56*b* for detecting a state together with the sensor 58 that an engagement state of the lock lever 54 with the malfunction preventing lever 56 is released, and an abutting part 56*c* which is abutted with an upper end of the latch lever 40 when the latch lever 40 attached to the elevating/lowering member 15 has been moved to the upper end side.

The engagement protruded part 56*a* is formed on the upper end side of the malfunction preventing lever 56. The detecting part 56*b* and the abutting part 56*c* are formed so as to protrude toward the rear side. A front end portion of the detecting part 56*b* is formed with a through hole into which the fixed shaft 59 is inserted. Further, the other end of the tension coil spring 57 is attached to an upper side of the through hole.

The sensor 58 is a transmission type optical sensor in which a light emitting element and a light receiving element are disposed so as to face each other. When the detecting part 56*b* of the malfunction preventing lever 56 blocks between the light emitting element and the light receiving element, it is detected that engagement of the engaging recessed part 54*e* with the engagement protruded part 56*a* has been released. In this embodiment, in a state that the detecting part 56*b* blocks between the light emitting element and the light receiving element, the placing part 12*a* of the placing table 12 is come out from the inside of the cartridge 3 and disposed on the underside of the cartridge 3. In other words, the sensor 58 functions for detecting that the placing part 12*a* is retreated from the cartridge 3.

In the cartridge holding mechanism 53 which is structured as described above, the lock lever 54 disposed on the upper end side of the card elevating/lowering device 6 is engaged with the front side of the cartridge 3 and the cartridge 3 which is placed on the cartridge support part 91 is held at a predetermined position. In the holding state, as shown in FIG. 16, the engaging recessed part 54*e* and the engagement protruded part 56*a* are engaged with each other. Therefore, even when a user grasps the handle part 54*a* of the lock lever 54 to try to lift to the upper side, the lock lever 54 is unable to turn in the clockwise direction and the handle part 54*a* is not lifted. In other words, in this holding state, the lock lever 54 cannot be turned in a direction in which the cartridge 3 is capable of being detached from the main body frame 10. In this holding state, the detecting part 56*b* of the malfunction preventing lever 56 is separated from the light emitting element and the light receiving element of the sensor 58.

When the cartridge 3 is to be detached from the main body frame 10, as described above, the hanging tool 30 is moved down to forcibly move the placing table 12 down so that the placing part 12*a* of the placing table 12 is come out from the inside of the cartridge 3 and disposed on an under side of the cartridge 3. When the placing table 12 is moved down, the latch lever 40 is moved upward together with the elevating/lowering member 15 and, as shown in FIG. 17, the upper end of the latch lever 40 is abutted with the abutting part 56*c* of the malfunction preventing lever 56. When the upper end of the latch lever 40 is abutted with the abutting part 56*c*, the malfunction preventing lever 56 is turned in the counterclockwise direction with the fixed shaft 59 as a center and the engagement of the engaging recessed part 54*e* with the engagement protruded part 56*a* is released.

When the engagement of the engaging recessed part 54*e* with the engagement protruded part 56*a* is released, turning of the lock lever 54 in the clockwise direction around the fixed shaft 55 is permitted and thus, when a user holds the handle part 54*a* to lift it to the upper side, the lock lever 54 is turned in the clockwise direction and the lock lever 54 is separated from the front side of the cartridge 3. When the lock lever 54 is separated from the front side of the cartridge 3, a releasing state is attained in which the cartridge 3 can be detached from the main body frame 10. In this releasing state, the detecting part 56*b* blocks between the light emitting element and the light receiving element of the sensor 58.

In this releasing state, when a user grasps the handle part 3*c* of the cartridge 3 to pull toward the front side, the cartridge support part 91 on which the cartridge 3 is placed is inclined toward the front side with the lower end side as a turning center and thus the cartridge 3 can be pulled out obliquely above from the main body frame 10.

[Structure of Card Carrying-out/Carrying-in Device]

FIG. 18 is a perspective view showing a part of a card carrying-out/carrying-in device 5 shown in FIG. 1. FIG. 19 is a plan view showing a part of the card carrying-out/carrying-in device 5 shown in FIG. 1. FIG. 20 is a front view showing a schematic structure of a part of the card carrying-out/carrying-in device 5 which is viewed in the "F-F" direction in FIG. 19. In the following descriptions, the clockwise direction in FIG. 13 is the clockwise direction and the counterclockwise direction is the counterclockwise direction.

At least an embodiment of the present invention provides a card carrying-out/carrying-in device 5 in which a carrying-out operation of a card 2 from a cartridge (card storage part) 3 where cards 2 are stacked and accommodated and a carrying-in operation of a card 2 to the cartridge (card storage part) 3 are appropriately performed.

The card carrying-out/carrying-in device 5 is, as shown in FIG. 18 and the like, provided with carrying rollers 61 for carrying a card 2, counter rollers 62 which are oppositely disposed to the carrying rollers 61, a motor 66 which drives the carrying rollers 61 and the counter rollers 62, and a power transmission mechanism 67 which transmits power of the motor 66 to the counter rollers 62. The power transmission mechanism 67 is structured so that the counter roller 62 is rotated by power of the motor 66 in the same direction as a rotating direction of the carrying roller 61. Further, the power transmission mechanism 67 is provided with a torque limiter 80 which intermits power transmission from the motor 66 to the counter roller 62 when a card 2 is carried out, and a one way clutch which disconnects power transmission from the motor 66 to the counter roller 62 when a card 2 is carried into the inside.

The card carrying-out/carrying-in device 5 is provided with the carrying rollers 61 which are abutted with a card 2 and carries the card 2 in the right and left direction, the counter rollers 62 which are oppositely disposed to the carrying rollers 61, taking-out rollers 63 which send out a card 2 toward the carrying rollers 61 from the cartridge 3 when the card 2 is carried out, and the support rollers 64 and 65 as support members which are abutted with an upper face of a card 2 located at the highest position in the cartridge 3 and support the card 2 when the card 2 is carried out. The taking-out rollers 63 and the support rollers 64 and 65 are disposed on the upper side with respect to the cartridge 3. The carrying rollers 61 and the counter rollers 62 are disposed on the left side of the taking-out rollers 63 and the support rollers 64 and 65 and are disposed at positions separated from an upward portion of the cartridge 3.

Further, the card carrying-out/carrying-in device 5 is provided with the motor 66 which rotationally drives the carrying roller 61, the counter roller 62 and the taking-out roller 63, and the power transmission mechanism 67 which transmits power from the motor 66 to the carrying roller 61, the counter roller 62 and the taking-out roller 63. In addition, the card carrying-out/carrying-in device 5 is provided with a sensor 68 for detecting a state that the taking-out roller 63 is located at a home position.

In this embodiment, when the carrying roller 61 is rotated in a clockwise direction, a card 2 accommodated in the cartridge 3 is carried out toward the card reader 4. Further, when the carrying roller 61 is rotated in a counterclockwise direction, a card 2 is carried in from the card reader 4 toward the cartridge 3.

The carrying rollers 61 are fixed to the rotation shaft 69 which is rotatably supported by a frame (not shown) of the card carrying-out/carrying-in device 5. In this embodiment, two carrying rollers 61 are fixed to the rotation shaft 69 in a separated state with a predetermined space in the front and rear direction. The carrying roller 61 is a round roller whose radius is constant. Further, the carrying roller 61 is a rubber roller in which a rubber tire is fitted to an outer peripheral side of a mandrel that is made of resin or metal.

The counter roller 62 is fixed to the rotation shaft 70. In this embodiment, similarly to the carrying roller 61, two counter rollers 62 are fixed to both end sides of the rotation shaft 70 in a separated state with a predetermined space in the front and rear direction. The counter roller 62 is a round roller whose radius is constant. Further, the counter roller 62 is a rubber roller in which a rubber tire is fitted to an outer peripheral side of a mandrel that is made of resin or metal.

The rotation shaft 70 is rotatably supported by a support frame 71 through a bearing. The support frame 71 is turnable with respect to a frame of the card carrying-out/carrying-in device 5 with the rotation shaft 73 disposed on the left side of the rotation shaft 70 as a turning center. The rotation shaft 73 is rotatably supported by a frame of the card carrying-out/carrying-in device 5.

Lower ends on the left end side of the support frame 71 are attached with one ends of two tension coil springs 74 the other ends of which are attached to the frame of the card carrying-out/carrying-in device 5. Therefore, the support frame 71 is, as shown in FIG. 20, urged in the counterclockwise direction with the rotation shaft 73 as a center. In other words, the counter roller 62 is urged toward the carrying roller 61 from a lower side. In this embodiment, the carrying roller 61 and the counter roller 62 are a round roller whose radius is constant.

The taking-out roller 63 is fixed to the rotation shaft 75 which is rotatably supported by the frame of the card carrying-out/carrying-in device 5. In this embodiment, similarly to the carrying roller 61, two taking-out rollers 63 are fixed to both end sides of the rotation shaft 75 in a separated state with a predetermined space in the front and rear direction. Further, the support roller 64 is rotatably supported by the rotation shaft 75. In this embodiment, two support rollers 64 are supported by the rotation shaft 75 in a separated state with a predetermined space in the front and rear direction and disposed on inner sides with respect to the taking-out rollers 63. The support roller 64 is a round roller whose radius is constant. Further, the support roller 64 is a resin roller which is formed of resin.

The taking-out roller 63 is a rubber roller in which a rubber tire is fitted to an outer peripheral side of a mandrel that is made of resin or metal. An outer peripheral side of the taking-out roller 63 is structured of a large diameter part 63*a* which is formed over a predetermined angular range around its rotation center and a small diameter part 63*b* whose radius is smaller than the large diameter part 63*a* In other words, the taking-out roller 63 is formed in a roughly sector shape.

A radius of the large diameter part 63*a* is set to be larger than a radius of the support roller 64. Further, a radius of the small diameter part 63*b* is set to be smaller than the radius of the support roller 64. In other words, the radius of the large diameter part 63*a* is set to be a size so that the large diameter part 63*a* is capable of abutting with the upper face of the uppermost card 2 which is abutted with the support roller 64. Further, the radius of the small diameter part 63*b* is set to be a size so that the small diameter part 63*b* is unable to abut with the upper face of the uppermost card 2 which is abutted with the support roller 64. Further, a circular arc length of the large diameter part 63*a* is set to be a length so that the uppermost card 2 is carried until at least the left end of the uppermost card 2 is reached to a portion between the carrying roller 61 and the counter roller 62.

The taking-out roller 63 which is disposed on the front side is formed with a detecting part 63*c* for detecting a home position of the taking-out roller 63 together with the sensor 68 so as to protrude toward the front side.

The support roller 65 is disposed on the right side of the taking-out roller 63 and is rotatably supported by a left end of the support frame 76. The support roller 65 is a round roller whose radius is constant. Further, the support roller 65 is a resin roller which is formed of resin. The support frame 76 is turnably supported by a fixed shaft 77 which is fixed to a right end side of the frame of the card carrying-out/carrying-in device 5. Further, the support frame 76 is urged by a spring not shown in a counterclockwise direction around the fixed shaft 77. In other words, the support roller 65 is, as shown in FIG. 13, urged in a direction abutting with the uppermost card 2 when the card 2 is to be carried out.

The power transmission mechanism 67 is provided with the pulley 78 which is fixed to an output shaft of the motor 66, the pulley 79 which is fixed to the rear end side of the rotation shaft 69, the torque limiter 80 whose output side is fixed to the rear end side of the rotation shaft 73, the pulley 81 which is fixed to the input side of the torque limiter 80, the pulley 82 which is fixed to a center part of the rotation shaft 73, and the pulley 83 which is fixed to a center part of the rotation shaft 70. A belt 84 is stretched over the pulleys 78, 79 and 81, and a belt 85 is stretched over the pulleys 82 and 83. Further, the power transmission mechanism 67 is provided with a tension pulley for applying a predetermined tension to the belt 84.

The torque limiter 80 intermits power which is transmitted from the motor 66 to the counter roller 62 depending on a magnitude of the power transmitted to the counter roller 62 from the motor 66. In other words, the torque limiter 80 is structured so that a slip is occurred between the motor 66 and the counter roller 62 without transmitting a torque larger than a specified value from the motor 66 to the counter roller 62. Further, the pulley 83 is a one way pulley within which a one way clutch is built in. Specifically, the pulley 83 is a one way pulley which is structured to run idle in the clockwise direction.

As described above, the belt 84 is stretched over the pulleys 78, 79 and 81 and the belt 85 is stretched over the pulleys 82 and 83. Therefore, the counter roller 62 in this embodiment is rotatable by power of the motor 66 in the same direction as a rotating direction of the carrying roller 61. In other words, when the carrying roller 61 is rotated in the clockwise direction, the motor 66 generates power for rotating the counter roller 62 in the clockwise direction and, when the carrying roller 61 is rotated in the counterclockwise direction, the motor 66 generates power for rotating the counter roller 62 in the counterclockwise direction. However, as described above, the pulley 83 in this embodiment is a one way pulley which is structured to run idle in the clockwise direction. Therefore, when the carrying roller 61 is rotated in the counterclockwise direction, the counter roller 62 urged toward the carrying roller 61 is rotated following the carrying roller 61 in the clockwise direction.

Further, the torque limiter 80 in this embodiment is structured so that, in a case that the carrying roller 61 is rotated in the clockwise direction, when one piece of card 2 is sandwiched between the carrying roller 61 and the counter roller 62, power transmission from the motor 66 to the counter roller 62 is disconnected and, when two pieces of card 2 are sandwiched between the carrying roller 61 and the counter roller 62, power is transmitted to the counter roller 62 from the motor 66.

In other words, the torque limiter 80 is structured so that, when one piece of card 2 is sandwiched between the carrying roller 61 and the counter roller 62 and thus frictional resistance between the card 2 which is abutted with the counter roller 62 and the carrying roller 61 becomes large, power transmission from the motor 66 to the counter roller 62 is disconnected. Further, the torque limiter 80 is structured so that, when two pieces of card 2 are sandwiched between the carrying roller 61 and the counter roller 62 and thus frictional resistance between the card 2 which is abutted with the counter roller 62 and the other card 2 becomes small, power is transmitted from the motor 66 to the counter roller 62.

Therefore, in this embodiment, in a case that the carrying roller 61 is rotated in the clockwise direction, when one piece of card 2 is sandwiched between the carrying roller 61 and the counter roller 62, the counter roller 62 is rotated following the carrying roller 61 in the counterclockwise direction. On the other hand, when two pieces of card 2 are sandwiched between the carrying roller 61 and the counter roller 62, power of the motor 66 is transmitted to the counter roller 62 and the counter roller 62 is rotated in the clockwise direction which is the same direction as that of the carrying roller 61.

Further, the power transmission mechanism 67 is provided with a gear 86 which is fixed to a center part of the rotation shaft 69, a gear 87 engaged with the gear 86, and a gear 88 which is fixed to a center part of the rotation shaft 75 and engaged with the gear 87. Therefore, the taking-out roller 63 is rotated in the same direction as the rotating direction of the carrying roller 61 by the power of the motor 66. In other words, when the carrying roller 61 is rotated in the clockwise direction, the taking-out roller 63 is rotated in the clockwise direction and, when the carrying roller 61 is rotated in the counterclockwise direction, the taking-out roller 63 is rotated in the counterclockwise direction.

The sensor 68 is a transmission type optical sensor in which a light emitting element and a light receiving element are disposed so as to face each other. When the detecting part 63*c* of the taking-out roller 63 blocks between the light emitting element and the light receiving element, the taking-out roller 63 is detected to be at the home position. In this embodiment, as shown in FIG. 20, the home position of the taking-out roller 63 is a state that a substantially center position of the large diameter part 63*a* in the circumferential direction is disposed at the right end and the clockwise direction end of the large diameter part 63*a* is located at a position just before abutted with the uppermost card 2.

[Carrying-out Operation and Carrying-in Operation of Card]

FIGS. 21(A), 21(B) and 21(C) are views for explaining a first half of a carrying-out operation of a card 2 in the card carrying-out/carrying-in device 5 shown in FIG. 18. FIGS. 22(A) and 22(B) are views for explaining a latter half of a carrying-out operation of a card 2 in the card carrying-out/carrying-in device 5 shown in FIG. 18. FIGS. 23(A) and 23(B) are views for explaining a carrying-in operation of a card 2 in the card carrying-out/carrying-in device 5 shown in FIG. 18.

In the card carrying-out/carrying-in device 5 structured as described above, a carrying-out operation of a card 2 from the inside of the cartridge 3 to the card reader 4 and a carrying-in operation of a card 2 from the card reader 4 into the cartridge 3 are performed as described below. Next, a carrying-out operation and a carrying-in operation of a card 2 will be described below.

When a card 2 is to be carried out, as described above, the placing table 12 is moved upward so that the uppermost card 2 in the cartridge 3 is abutted with the support rollers 64 and 65 with a predetermined abutting force. In this case, since the taking-out roller 63 is located at the home position, as shown in FIG. 21(A), the taking-out roller 63 is not abutted with the uppermost card 2.

In this state, when the motor 66 begins to rotate in the clockwise direction, the carrying roller 61 and the taking-out roller 63 are turned in the clockwise direction and the large diameter part 63*a* is abutted with an upper face of the uppermost card 2. When the large diameter part 63*a* is abutted with the uppermost card 2, as shown in FIG. 21(B), the taking-out roller 63 sends out the card 2 toward the carrying roller 61 and the card 2 is sandwiched between the carrying roller 61 and the counter roller 62. In this case, the counter roller 62 is rotated following the carrying roller 61 in the counterclockwise direction as described above.

When two pieces of card 2 are sandwiched between the carrying roller 61 and the counter roller 62, as described above, the counter roller 62 is rotated in the clockwise direction which is the same as that of the carrying roller 61. In other words, the counter roller 62 is rotated in a direction that a card 2 is carried into the inside. Therefore, the second card 2 from the highest (the card 2 just under the uppermost card 2) which is abutted with the counter roller 62 is returned to the cartridge 3.

In addition, when the taking-out roller 63 is turned in the clockwise direction, as shown in FIG. 21(C), the counterclockwise end of the large diameter part 63*a* is abutted with the right side end of the uppermost card 2 and, after that, the large diameter part 63*a* (taking-out roller 63) is separated from the uppermost card 2. The card 2 separated from the large diameter part 63*a* of the taking-out roller 63 is carried out by the carrying roller 61 and the counter roller 62. Further, when the uppermost card 2 is separated from the large diameter part 63*a,* an upper face of the next uppermost card 2 is abutted with the support rollers 64 and 65. In this state, even when the taking-out roller 63 is turned, the small diameter part 63*b* is passed through the next uppermost card 2 which is abutted with the support rollers 64 and 65 and thus the taking-out roller 63 is not abutted with the upper face of the next uppermost card 2.

Further, when the uppermost card 2 has been separated from the taking-out roller 63, an upper face of the next uppermost card 2 is abutted with the support rollers 64, 65 as shown in FIG. 22(A). In this state, even when the taking-out roller 63 is turned, the taking-out roller 63 is not abutted with an upper face of the next uppermost card 2. In other words, the small diameter part 63*b* is passed through on an upper side of the next uppermost card 2 which is abutted with the support rollers 64 and 65.

When the taking-out roller 63 is turned once (in other words, when the carrying roller 61 is turned once), the right side end of the uppermost card 2 is, as shown in FIG. 22(B), is separated from between the carrying roller 61 and the counter roller 62 and the carrying-out operation of the card 2 has finished.

When a card 2 is to be carried into the inside, as described above, the placing table 12 is moved down so that the uppermost card 2 in the cartridge 3 is disposed between the sensor 24 and the sensor 25. In other words, as shown in FIG. 23(A), an accommodating space for a card 2 is formed in the inside of the cartridge 3 on a lower side with respect to the card carrying-out/carrying-in device 5.

In this state, when the motor 66 begins to rotate in the counterclockwise direction, the carrying roller 61 and the taking-out roller 63 are rotated in the counterclockwise direction and a card 2 sandwiched between the carrying roller 61 and the counter roller 62 is carried toward the cartridge 3. In this case, the counter roller 62 is, as described above, rotated following the carrying roller 61 in the clockwise direction.

In addition, when the carrying roller 61 and the counter roller 62 are rotated and the card 2 is carried to the right direction, the left side end of the card 2 is separated from between the carrying roller 61 and the counter roller 62. In this embodiment, as shown in FIG. 22(B), the taking-out roller 63 is turned so that a counterclockwise end of the large diameter part 63*a* is abutted with a roughly center position of the card 2 in the right and left direction (in other words, the large diameter part 63*a* begins to abut with the card 2) at a timing when the left side end of the card 2 is separated from between the carrying roller 61 and the counter roller 62.

Therefore, the card 2 separated from between the carrying roller 61 and the counter roller 62 is tapped by the large diameter part 63*a* to be dropped into the cartridge 3. The dropping card 2 is, as described above, pressed to the front side of the cartridge 3 by the flat spring 48 (see FIG. 14).

[Principal Effects of Card Elevating/Lowering Device and Card Issuing/Collecting Apparatus in this Embodiment]

As described above, in this embodiment, the placing table 12 on which cards 2 within the cartridge 3 are placed is urged in the upper direction by the tension coil spring 13. Further, the spring constant of the tension coil spring 13 is substantially equal to the weight per unit thickness of the card 2. Therefore, when the card 2 is carried out, the tension coil spring 13 is contracted by the number of sheets of the card 2 carried out from the cartridge 3 and the cards 2 are moved upward together with the placing table 12. Accordingly, even when the position of the elevating/lowering member 15 is not changed, a card 2 at the uppermost position in the cartridge 3 is always abutted with the support rollers 64 and 65 with a substantially constant abutting force. Further, when a card 2 is carried into the inside, the tension coil spring 13 is extended by the number of sheets of the card 2 carried into the cartridge 3 and the cards 2 are moved down together with the placing table 12. Therefore, even when the position of the elevating/lowering member 15 is not changed, the position of the card 2 at the uppermost position is always located between the sensor 24 and the sensor 25. As described above, in this embodiment, the cards 2 are appropriately elevated and lowered at the time of carrying-out of a card 2 and carrying-in of a card 2 with a simple structure in which the tension coil spring 13 is used.

Especially in this embodiment, since the placing table 12 is urged in the upper direction by the tension coil spring 13, the setting of the spring constant is easy in comparison with a case that the placing table 12 is urged in the upper direction by another urging member such as a flat spring. Further, in comparison with a case that the placing table 12 is urged in the upper direction by another urging member, when the tension coil spring 13 is used, the stroke can be lengthened and thus the number of sheets of card 2 accommodated in the cartridge 3 is increased.

In this embodiment, the tension coil spring 13 is hanged over the pulley 14 which is disposed on the upper end side of the card elevating/lowering device 6. In other words, the tension coil spring 13 is turned around in the up-and-down direction by the pulley 14. Therefore, even when a length of the tension coil spring 13 is made longer in order that the spring constant of the tension coil spring 13 is set to be smaller, the size of the card elevating/lowering device 6 in the up-and-down direction can be reduced.

In this embodiment, the other end of the tension coil spring 13 is attached to the elevating/lowering member 15. Therefore, the position of the other end of the tension coil spring 13 can be changed arbitrarily, and the position of the placing table 12 to which one end of the tension coil spring 13 is attached can be changed arbitrarily. Therefore, the position of the uppermost card 2 placed on the placing table 12 can be set arbitrarily and thus, as described above, an accommodating space for a card 2 is formed on the upper end side of the cartridge 3 and a card 2 can be accommodated in the cartridge 3.

In this embodiment, the belt 18 to which the elevating/lowering member 15 is fixed is a toothed belt and the pulleys 16 and 17 over which the belt 18 is stretched are a toothed pulley. Therefore, slip between the pulleys 16 and 17 and the belt 18 is prevented and the elevating/lowering member 15 can be elevated and lowered with a high degree of accuracy.

In this embodiment, the elevating/lowering mechanism 11 is provided with the holding mechanism 20 for holding the position of the elevating/lowering member 15 in the up-and-down direction. Therefore, the position of the elevating/lowering member 15 to which the other end of the tension coil spring 13 is attached is held by the holding mechanism 20 and thus, the positional displacement of the placing table 12 to which one end of the tension coil spring 13 is attached is prevented. In other words, positional displacement of the uppermost card 2 placed on the placing table 12 is prevented. Further, the elevating/lowering mechanism 11 is provided with the releasing mechanism 21 for releasing the holding state of the elevating/lowering member 15 by the holding mechanism 20 and thus the elevating/lowering member 15 having been held by the holding mechanism 20 can be set in a movable state in the up-and-down direction.

In this embodiment, the position of the elevating/lowering member 15 in the up-and-down direction is held by the rack tooth 39*a* and the engagement pawl 40*a* which are engaged with each other. Therefore, the elevating/lowering member 15 can be held by a plurality of the rack teeth 39*a* over a relatively wide range in the up-and-down direction. Further, the holding position of the elevating/lowering member 15 can be set finely by a plurality of the rack teeth 39*a*. Therefore, the position of the uppermost card 2 placed on the placing table 12 can be set finely.

In this embodiment, the sensors 24 and 25 are disposed so that a predetermined space in the up-and-down direction is formed between the uppermost card 2 disposed between the sensor 24 and the sensor 25 and the upper end of the cartridge 3. Therefore, when the motor 31 is driven on the basis of detection results of the sensors 24 and 25, an appropriate accommodating space for a card 2 can be formed on the upper end side of the cartridge 3.

In this embodiment, the flat spring 48 is disposed on the upper end side of the cartridge 3 for pressing a card 2 to the front side which is dropped into the cartridge 3 from an upper side of the cartridge 3 at the time of a carrying-in operation of the card 2. Therefore, frictional resistance can be reduced between inner walls in the front and rear direction of the cartridge 3 and a plurality of accommodated cards 2 and the card 2 can be accommodated into the cartridge 3 appropriately.

In other words, when a card 2 is randomly dropped into the cartridge 3 from the upper side of the cartridge 3, a card 2 abutting with an inner wall on the front side, a card 2 abutting with an inner wall on the rear side, and a card 2 abutting with neither of the inner walls are stacked at random. Further, when the stacked number of the cards 2 is increased, frictional resistance between the cards 2 becomes large and each of the cards 2 is hardly displaced to the one side or to the other side. Therefore, the entire of the stacked cards 2 are brought into a state that external forces are applied to the stacked cards 2 from the inner walls in the front and rear direction of the cartridge 3 and thus frictional resistance between the cartridge 3 and a plurality of accommodated cards 2 becomes large. On the other hand, in this embodiment, a card 2 is hard to be abutted with the inner wall on the rear side of the cartridge 3 and thus the entire of the stacked cards 2 is hard to be in a state that external forces are applied from both of the inner walls in the front and rear direction of the cartridge 3. Therefore, in this embodiment, frictional resistance can be reduced between the inner walls in the front and rear direction of the cartridge 3 and a plurality of accommodated cards 2 and thus cards 2 can be appropriately accommodated in the cartridge 3.

In this embodiment, the cartridge holding mechanism 53 is provided with the malfunction preventing lever 56 which is engaged with the lock lever 54 that holds the cartridge 3 at a predetermined position for preventing malfunction of the lock lever 54. Further, the malfunction preventing lever 56 is turned by utilizing the latch lever 40 which is moved upward to the upper end side when the placing part 12*a* of the placing table 12 is disposed on the underside of the cartridge 3 to release the engagement of the lock lever 54 with the malfunction preventing lever 56. Therefore, a mechanism for turning the malfunction preventing lever 56 is not required to provide separately and thus the structure of the card lifting device 6 is simplified.

[Principal Effects of Card Carrying-out/Carrying-in Device and Card Issuing/Collecting Apparatus in this Embodiment]

As described above, in this embodiment, the counter roller 62 is capable of rotating in the same direction as the rotating direction of the carrying roller 61 by power of the motor 66. Further, the torque limiter 80 is structured so that, in a case that the carrying roller 61 is rotated in the clockwise direction (in other words, in a case that a card 2 is carried out), when one piece of card 2 is sandwiched between the carrying roller 61 and the counter roller 62, power transmission from the motor 66 to the counter roller 62 is disconnected and, when two pieces of card 2 are sandwiched between the carrying roller 61 and the counter roller 62, power is transmitted to the counter roller 62 from the motor 66.

Therefore, as described above, in a case that a card 2 is to be carried out, when one piece of card 2 is sandwiched between the carrying roller 61 and the counter roller 62, the counter roller 62 is rotated following the carrying roller 61. Therefore, the card 2 is appropriately carried out from the cartridge 3. Further, when two pieces of card 2 are sandwiched between the carrying roller 61 and the counter roller 62, power of the motor 66 is transmitted to the counter roller 62 and the counter roller 62 is rotated in a direction in which a card 2 is carried into the inside. Therefore, the second card 2 from the uppermost card 2 which is abutted with the counter roller 62 is returned to the cartridge 3 and thus double feeding of the card 2 can be prevented.

Further, in this embodiment, the pulley 83 is a one way pulley which is structured to run idle in the clockwise direction. Therefore, when a card 2 is to be carried into the inside, the counter roller 62 runs idle following the carrying roller 61 in the carrying-in direction of the card 2. Therefore, a carrying-in operation of the card 2 is not disturbed by the counter roller 62.

As described above, in this embodiment, when a card 2 is to be carried out, double feeding of a card 2 is prevented and a card 2 can be carried out from the cartridge 3 appropriately. Further, also when a card 2 is to be carried into the inside, the card 2 can be carried into the cartridge 3 appropriately.

In this embodiment, a radius of the large diameter part 63*a* which structures an outer peripheral side of the taking-out roller 63 is set to be larger than a radius of the support roller 64 which is coaxially disposed with the taking-out roller 63. Further, a radius of the small diameter part 63*b* is set to be smaller than the radius of the support roller 64. Further, the support roller 65 is urged in the direction so as to be abutted with the uppermost card 2 in the cartridge 3. Therefore, when the large diameter part 63*a* of the taking-out roller 63 sends out the uppermost card 2 toward the carrying roller 61 and the large diameter part 63*a* is separated from the card 2, the support rollers 64 and 65 support the next uppermost card 2 and the small diameter part 63*b* of the taking-out roller 63 is passed through the upper side of the next uppermost card 2. Therefore, the taking-out roller 63 does not send out the next uppermost card 2. As a result, a card 2 can be sent out one by one from the cartridge 3 to the carrying roller 61.

In this embodiment, the uppermost card 2 is supported at three points by two support rollers 64 which are disposed in a separated state with a predetermined space in the front and rear direction and one support roller 65 which is disposed on the right side of the support rollers 64. Therefore, the uppermost card 2 can be supported in a stable state. Further, in this embodiment, the uppermost card 2 is supported by the rotatable support rollers 64 and 65 and thus, even when the card 2 is abutted with the support rollers 64 and 65, the card 2 is restrained from being damaged.

In this embodiment, when a card 2 is carried into the inside, the taking-out roller 63 is turned so that a counterclockwise end of the large diameter part 63*a* is abutted with a roughly center position of the card 2 in the right and left direction at a timing when the left side end of the card 2 is separated from between the carrying roller 61 and the counter roller 62. Therefore, as described above, the card 2 separated from between the carrying roller 61 and the counter roller 62 is tapped by the large diameter part 63*a* to be dropped into the cartridge 3. Therefore, the card 2 is easily dropped into the inside of the cartridge 3 in a horizontal state and the card 2 carried into the inside can be appropriately stacked in the cartridge 3.

[Other Embodiments]

Although the present invention has been shown and described with reference to a specific embodiment, various changes and modifications will be apparent to those skilled in the art from the teachings herein.

In the embodiment described above, the tension coil spring 13 is hanged down through the pulley 14. However, the present invention is not limited to this embodiment. For example, instead of the tension coil spring 13 which is hanged down through pulley 14, the elevating/lowering member 15 may be disposed on an upper side of the placing table 12. Further, in the embodiment described above, the other end of the tension coil spring 13 is attached to the elevating/lowering member 15. However, the other end of the tension coil spring 13 may be directly attached to the belt 18.

In accordance with an embodiment of the present invention, when the card issuing/collecting apparatus 1 is provided with only an issuing function of a card 2, the placing table 12 may be urged by a compression coil spring in the upper direction instead of the tension coil spring 13. In this case, the compression coil spring is disposed on a lower side of the placing table 12. Further, in this case, the spring constant of the compression coil spring is set to be substantially equal to the weight per unit thickness of the card 2. Further, the placing table 12 may be urged in the upper direction by another spring or an elastic member instead of the compression coil spring.

In the embodiment described above, a one way clutch is built in the inside of the pulley 83. However, the present invention is not limited to this embodiment. For example, the one way clutch may be built in the inside of the counter roller 62. Further, in the embodiment described above, the torque limiter 80 is attached to the rotation shaft 73. However, a torque limiter having a similar function to the torque limiter 80 may be attached to the rotation shaft 70.

In the embodiment described above, the uppermost card 2 in the cartridge 3 is supported at three points by two support rollers 64 and one support roller 65. However, the present invention is not limited to this embodiment. For example, the uppermost card 2 may be supported at four points or more by two or more support rollers 65.

In the embodiment described above, when a card 2 is to be carried out, the uppermost card 2 in the cartridge 3 is abutted with the support rollers 64 and 65. However, the present invention is not limited to this embodiment. For example, a spherical member (in other words, ball) which is abutted with the uppermost card 2 may be disposed instead of the support rollers 64 and 65. Further, instead of the support rollers 64 and 65, a support projection formed of material which is superior in sliding property may be disposed so as to abut with the uppermost card 2.

In the embodiment described above, the card reader 4 for performing recording on and reproduction from a card 2 is disposed on the left side of the card carrying-out/carrying-in device 5. However, the present invention is not limited to this embodiment. For example, another card processing device such as a card feeding device having only a feeding function of a card 2 or a card printing device having a printing function for printing on a card 2 may be disposed on the left side of the card carrying-out/carrying-in device 5.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card elevating/lowering device for use with cards, the device comprising:

a card storage part in which the cards are stacked and accommodated; and an elevating/lowering mechanism by which the cards accommodated in the card storage part are elevated and lowered;

wherein the elevating/lowering mechanism is provided with a placing table on which the cards accommodated in the card storage part are placed and an urging member which urges the placing table in an upper direction;

wherein a spring constant of the urging member is substantially equal to a weight per unit thickness of the card;

wherein the urging member is a tension coil spring;

wherein one end of the tension coil spring is attached to the placing table and the other end of the tension coil spring is attached to a spring end fixing member which is movable in an up-and-down direction; and wherein the elevating/lowering mechanism is provided with a holding mechanism for holding a position of the spring end fixing member in the up-and-down direction and a releasing mechanism for releasing a holding state of the spring end fixing member by the holding mechanism.

2. The card elevating/lowering device according to claim 1, wherein the elevating/lowering mechanism is provided with a pulley for spring over which the tension coil spring is hanged.

3. The card elevating/lowering device according to claim 1, wherein the spring end fixing member is attached to a belt stretched over at least two pulleys for belt which are disposed in a separated state in the up-and-down direction.

4. The card elevating/lowering device according to claim 3, wherein the at least two pulleys for belt are toothed pulleys and the belt is a toothed belt.

5. The card elevating/lowering device according to claim 1, wherein the holding mechanism is provided with a rack having a plurality of rack teeth and disposed with the up-and-down direction as a longitudinal direction, an engagement pawl which is attached to the spring end fixing member in a relatively movable state and is capable of being engaged with the rack tooth, and an engagement pawl urging member which urges the engagement pawl toward the rack tooth, and the releasing mechanism is provided with a releasing member which is turned with the up-and-down direction as an axial direction to move the engagement pawl in a direction that engagement of the rack tooth with the engagement pawl is released and a turning mechanism for turning the releasing member.

6. The card elevating/lowering device according to claim 1, further comprising a detection mechanism for detecting that an uppermost card of the cards which are accommodated in the card storage part is located at a predetermined position, wherein the detection mechanism is disposed so that a predetermined space is formed between the uppermost card which is detected by the detection mechanism and an upper end of the card storage part.

7. The card elevating/lowering device according to claim 1, further comprising a flat spring which is disposed on an upper end side of the card storage part for pressing a card dropped from an upper side of the card storage part toward one side.

8. A card issuing/collecting apparatus comprising:

the card elevating/lowering device described in claim 1; and a card carrying-out/carrying-in device in which a card is carried out from the card storage part and a card is carried into the card storage part.

* * * * *